US010202095B2

(12) United States Patent
Ohno

(10) Patent No.: US 10,202,095 B2
(45) Date of Patent: Feb. 12, 2019

(54) OCCUPANT PROTECTION SYSTEM

(71) Applicant: TOYOTA JIDOSHA KABUSHIKI KAISHA, Toyota-shi, Aichi-ken (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/355,574

(22) Filed: Nov. 18, 2016

(65) Prior Publication Data
US 2017/0203711 A1 Jul. 20, 2017

(30) Foreign Application Priority Data
Jan. 20, 2016 (JP) .................. 2016-009291

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/203* (2013.01); *B60R 21/207* (2013.01); *B60R 21/215* (2013.01); *B60R 21/231* (2013.01); *B60R 21/237* (2013.01); *B60R 21/26* (2013.01); *B60R 21/261* (2013.01); *B60R 2021/0048* (2013.01); *B60R 2021/2074* (2013.01); *B60R 2021/23107* (2013.01); *B60R 2021/23308* (2013.01); *B60R 2021/2612* (2013.01)

(58) Field of Classification Search
CPC ... B60R 21/233; B60R 21/207; B60R 21/237; B60R 21/231; B60R 21/23138; B60R 21/261; B60R 2021/2612; B60R 2021/2615; B60R 2021/23107; B60R 2021/0006; B60R 2021/0018; B60R 2021/0048; B60R 2021/23146; B60R 2021/23308; B60R 2021/2074
USPC .................. 280/730.1, 743.1, 729
See application file for complete search history.

(56) References Cited

U.S. PATENT DOCUMENTS

| 8,016,066 | B1 * | 9/2011 | Boxey ...................... B60R 21/36 180/271 |
| 2008/0284144 | A1 * | 11/2008 | Smydra ............... B60R 21/2338 280/736 |
| 2016/0121839 | A1 * | 5/2016 | Ko ........................ B60R 21/233 280/730.1 |

FOREIGN PATENT DOCUMENTS

DE 19859988 B4 6/2010
FR 2667831 A1 * 4/1992 .......... B60R 21/207
(Continued)

*Primary Examiner* — Keith J Frisby
(74) *Attorney, Agent, or Firm* — Oliff PLC

(57) ABSTRACT

An occupant protection system including: a first airbag; and a second airbag, wherein the second airbag has a pair of lateral inflating portions which cover the entire head of the occupant from both sides in the vehicle width direction and an upper deploying portion which covers the head of the occupant from the upper side in the vehicle vertical direction, the pair of lateral inflating portions and the upper deploying portion are each supported in back in the vehicle forward and rearward direction by the vehicle seat, and in the inflated and deployed state of the second airbag, vehicle vertical direction upper edge portions of the pair of lateral inflating portions and vehicle width direction side edge portions of the upper deploying portion are connected to each other from their rear end side to their front end side in the vehicle forward and rearward direction.

10 Claims, 14 Drawing Sheets

(51) Int. Cl.
   *B60R 21/237*   (2006.01)
   *B60R 21/231*   (2011.01)
   *B60R 21/203*   (2006.01)
   *B60R 21/215*   (2011.01)
   *B60R 21/26*    (2011.01)
   *B60R 21/261*   (2011.01)
   *B60R 21/00*        (2006.01)

(56) References Cited

FOREIGN PATENT DOCUMENTS

| | | |
|---|---|---|
| JP | H08-175309 A | 7/1996 |
| JP | 2000-344044 A | 12/2000 |
| JP | 2007-230396 A | 9/2007 |
| JP | 2013-018378 A | 1/2013 |
| JP | 2015-013553 A | 1/2015 |

* cited by examiner

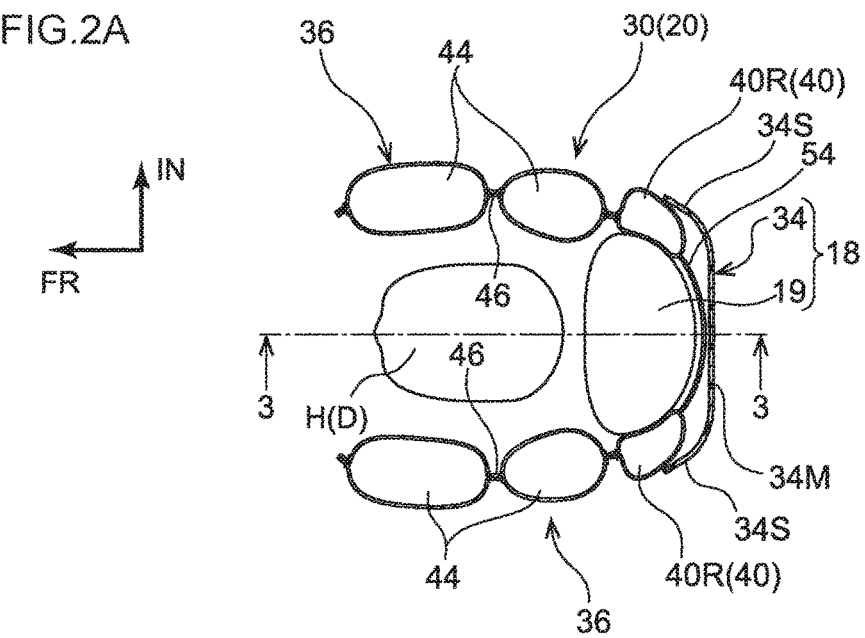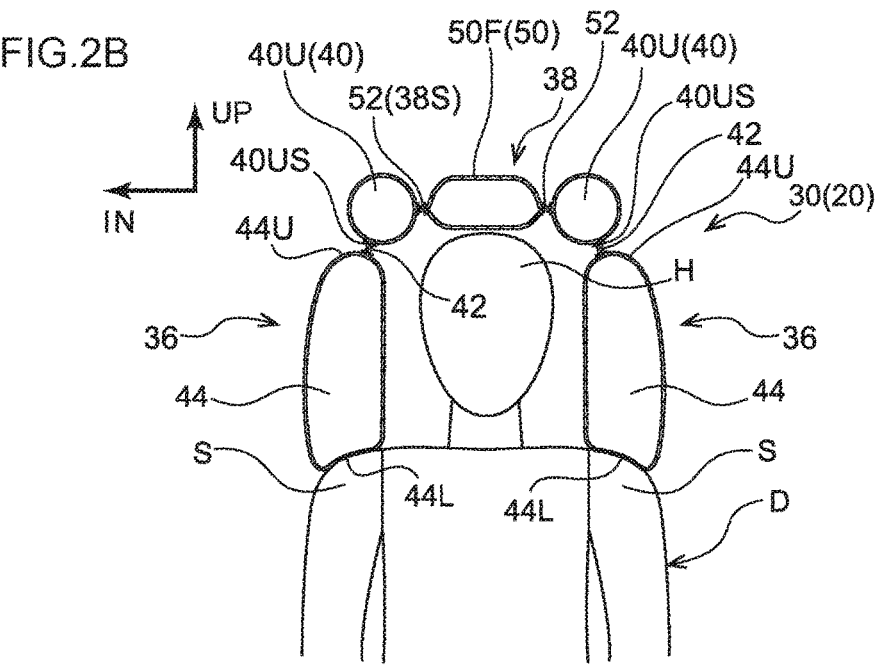

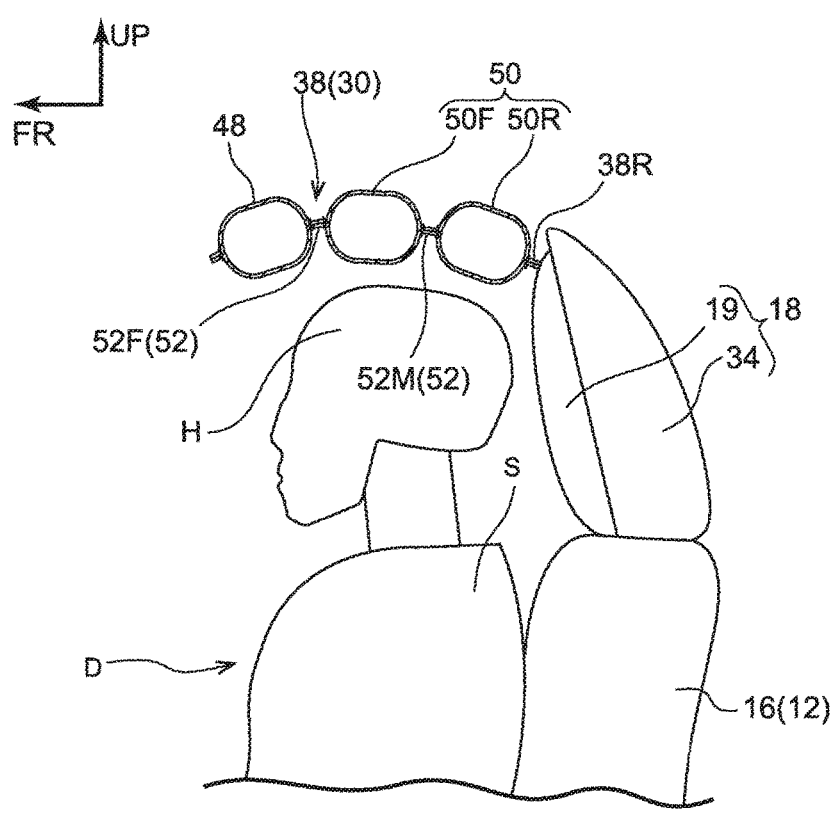

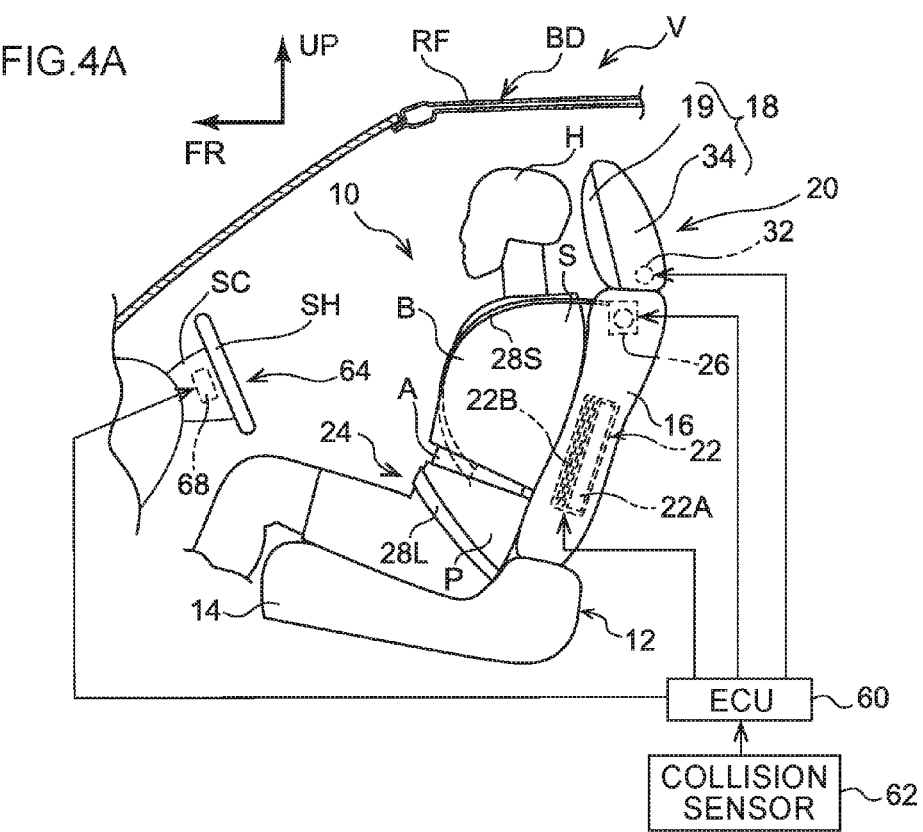

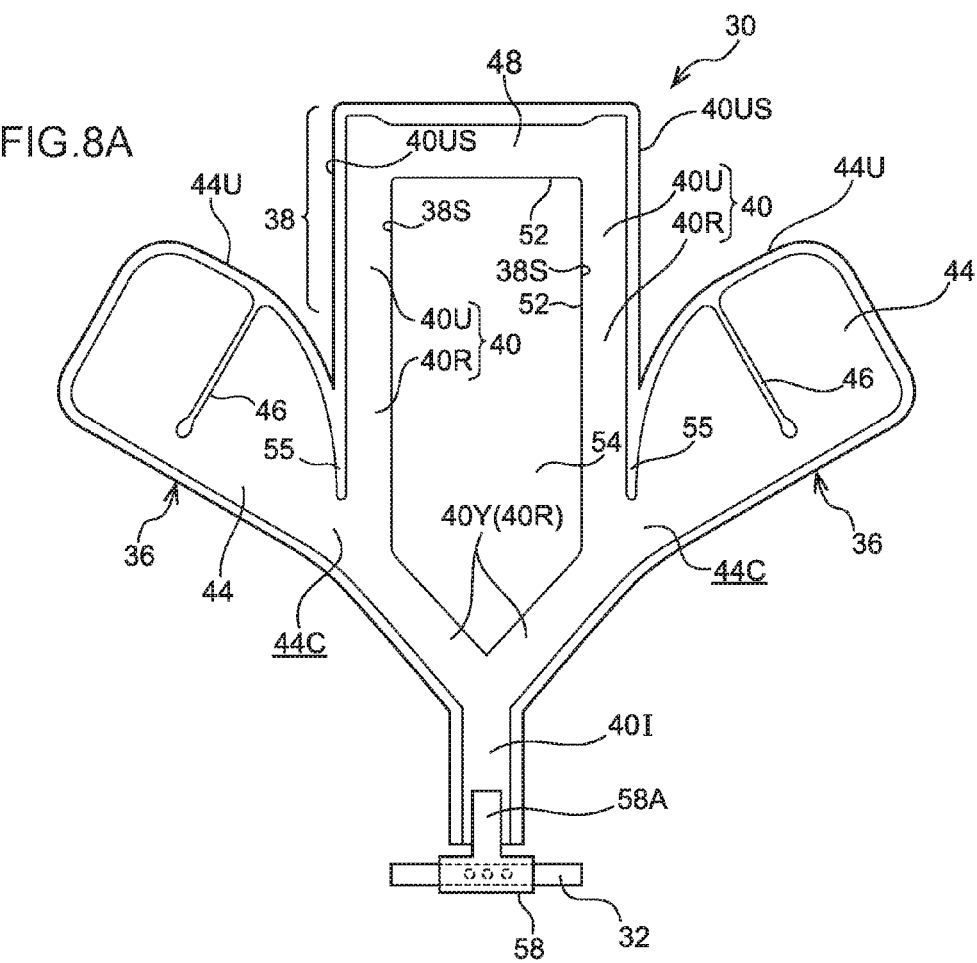
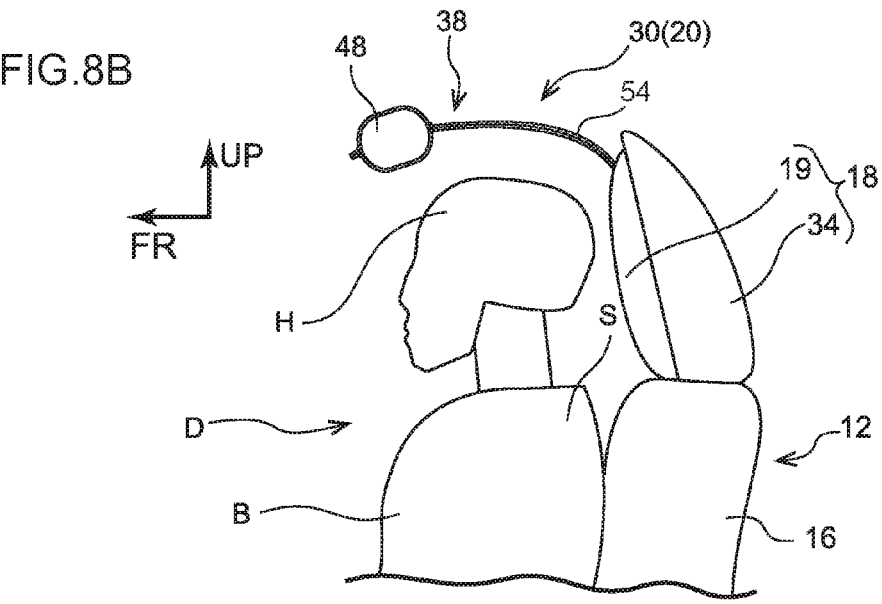

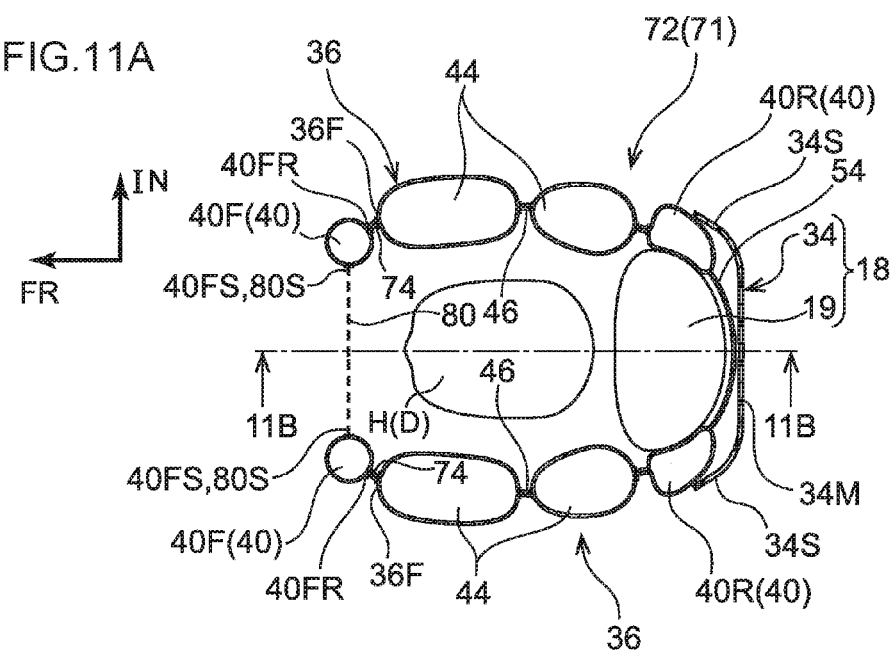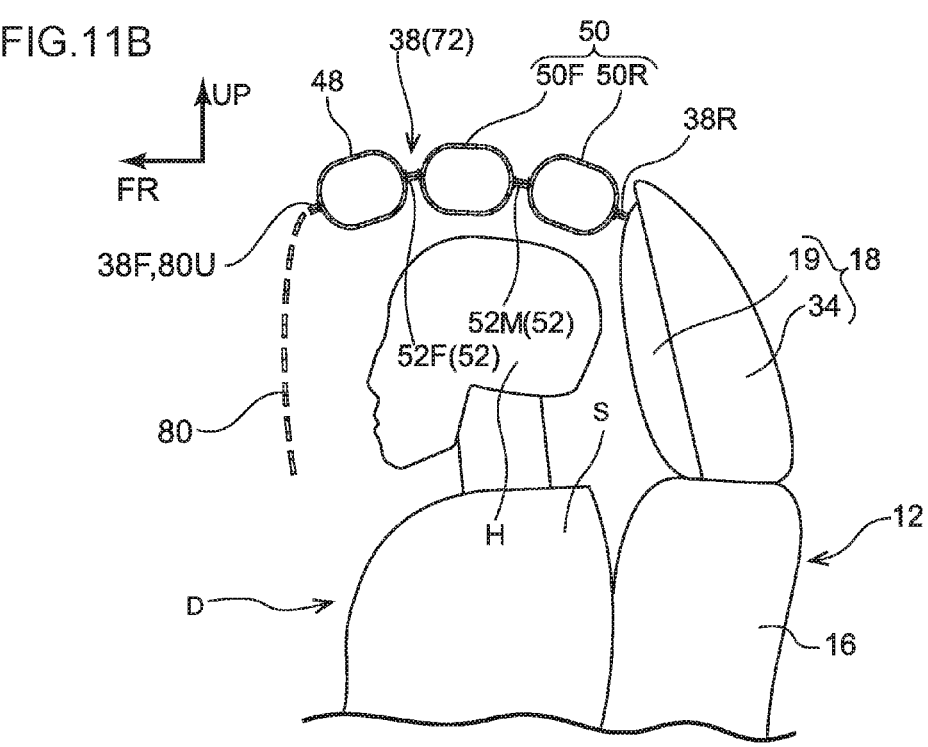

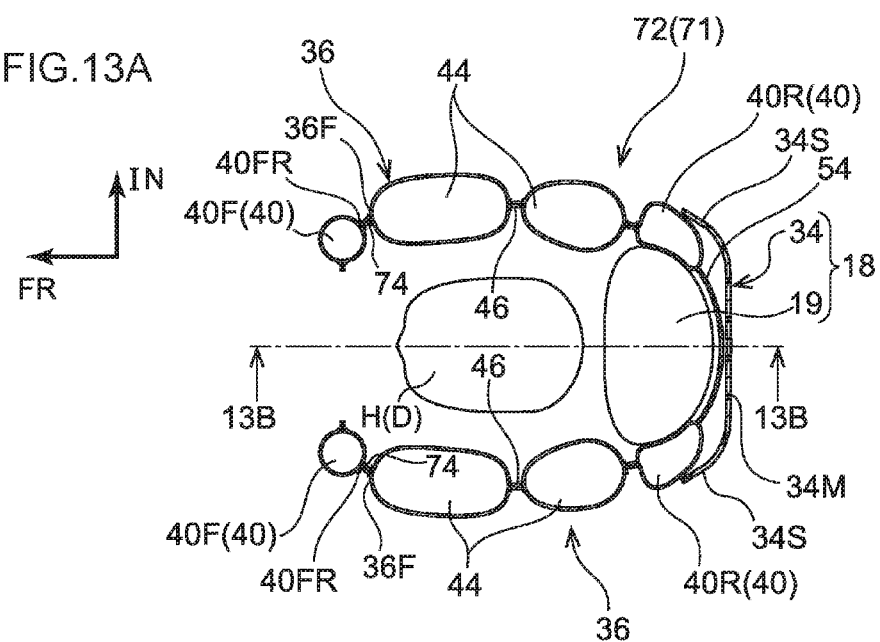
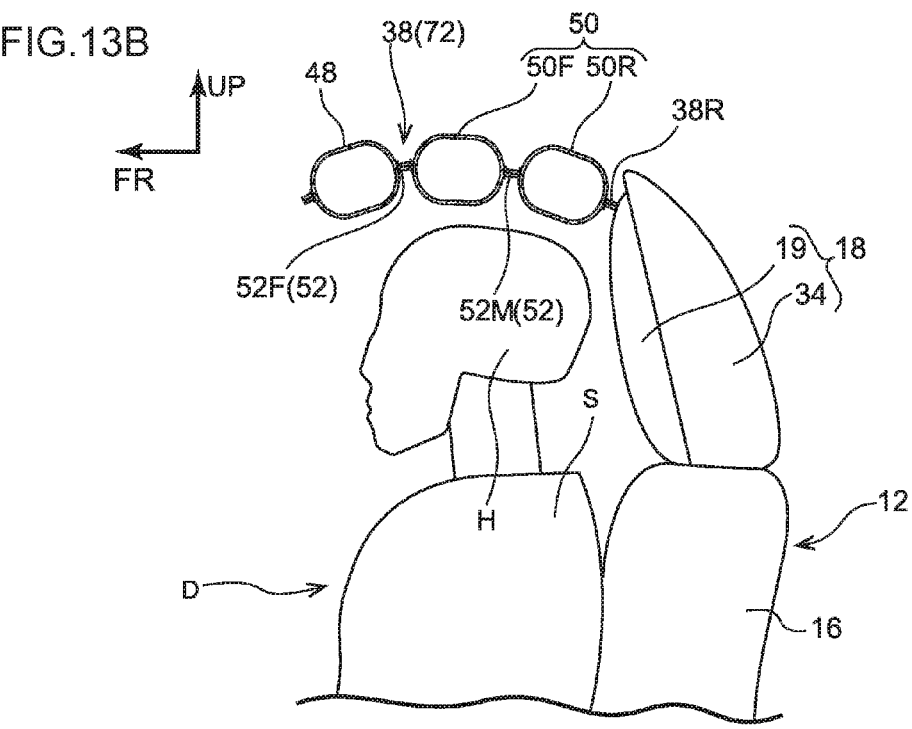

OCCUPANT PROTECTION SYSTEM

CROSS-REFERENCE TO RELATED APPLICATION

This application is based on and claims priority under 35 USC 119 from Japanese Patent Application No. 2016-009291 filed on Jan. 20, 2016, the disclosure of which is incorporated by reference herein.

BACKGROUND

Technical Field

The present disclosure relates to an occupant protection system.

Related Art

A head rest attached to a seat in a vehicle and equipped with a built-in airbag of an airbag device is known (see Japanese Patent Application Laid-open (JP-A) No. H8-175309). In its inflated state the airbag with which the head rest is equipped expands in a substantially forward direction from the sides of a head portion.

Furthermore, a head rest airbag that is housed in a head rest and configured to receive a supply of gas at the time of a side impact to become inflated and deployed, before a curtain airbag, on both vehicle width direction sides of the head of an occupant is also known (see JP-A No. 2015-13553).

This airbag has a duct portion, which inflates in back of the head, and an inside bag portion and an outside bag portion, which inflate on both sides of the head. The duct portion is coupled by tethers to the inside bag portion and the outside bag portion.

In the configuration of JP-A No. H8-175309, it is difficult to stabilize the deployment behavior of the airbag because the airbag becomes inflated and deployed alone from the sides of the head rest. In the configuration of JP-A No. 2015-13553, the head rest airbag is effective for a relatively small capacity head rest airbag used in combination with a curtain airbag, but it is difficult to stabilize the deployment behavior of the head rest airbag if the capacity of the head rest airbag is increased.

SUMMARY

The present disclosure provides an occupant protection system that can protect the head of an occupant from various types of crashes by stabilizing the deployment behavior of an airbag having a pair of lateral inflating portions that become inflated and deployed from a vehicle vertical direction upper portion of a vehicle seat and cover the entire head of the occupant from both sides in the vehicle width direction.

A vehicle occupant system of a first aspect includes: a first airbag that is housed in a section of a vehicle body located in front of an occupant in the vehicle forward and rearward direction and receives a supply of gas to become inflated and deployed in front of the occupant in the vehicle forward and rearward direction; and a second airbag that is housed in a vehicle vertical direction upper portion of a vehicle seat and receives a supply of gas to become inflated and deployed, wherein the second airbag has a pair of lateral inflating portions which, in the inflated and deployed state of the second airbag, cover the entire head of the occupant from both sides in the vehicle width direction and an upper deploying portion which, in the inflated and deployed state of the second airbag, covers the head of the occupant from the upper side in the vehicle vertical direction, the pair of lateral inflating portions and the upper deploying portion are, in the inflated and deployed state of the second airbag, each supported in back in the vehicle forward and rearward direction by the vehicle seat, and in the inflated and deployed state of the second airbag, vehicle vertical direction upper edge portions of the pair of lateral inflating portions and vehicle width direction side edge portions of the upper deploying portion are connected to each other from their rear end side to their front end side in the vehicle forward and rearward direction.

In this occupant protection system, for example, with respect to a frontal impact, the occupant is protected mainly by the first airbag. Furthermore, for example, with respect to a side impact, the head of the occupant is protected mainly by the lateral inflating portions of the second airbag.

Here, in the second airbag, the upper edge portions of the pair of lateral inflating portions and the side edge portions of the upper deploying portion that are each supported in back in the vehicle forward and rearward direction by the upper portion of the vehicle seat are connected to each other from their rear end side to their front end side in the vehicle forward and rearward direction. For this reason, as the pair of lateral inflating portions are being inflated and deployed, the deployment direction of the pair of lateral inflating portions is limited by the upper portion of the vehicle seat and the upper deploying portion, and the second airbag becomes stably inflated and deployed. Furthermore, the occupant protection system is equipped with the first airbag that protects the occupant mainly with respect to a frontal impact, so the second airbag does not need a front inflating portion that inflates and deploys in front of the head of the occupant in the vehicle forward and rearward direction. For this reason, compared to a configuration where a front inflating portion integrally disposed in the second airbag is inflated and deployed in front of the head of the occupant in the vehicle forward and rearward direction, the pair of lateral inflating portions of the second airbag can be stably inflated and deployed on both sides of the head of the occupant in the vehicle width direction.

In this way, the occupant protection system of the first aspect can protect the head of an occupant from various types of crashes by stabilizing the deployment behavior of the airbag having the pair of lateral inflating portions that become inflated and deployed from the vehicle vertical direction upper portion of the vehicle seat and cover the entire head of the occupant from both sides in the vehicle width direction.

An occupant protection system of a second aspect is the configuration of the first aspect, wherein the second airbag has frame ducts including a pair of upper ducts which, in the inflated and deployed state of the second airbag, extend in the vehicle forward and rearward direction alongside each other in the vehicle width direction in positions on the upper side of the head of the occupant in the vehicle vertical direction and away from each other on one side and the other side of the head of the occupant in the vehicle width direction, and the vehicle vertical direction upper edge portions of the pair of lateral inflating portions and the vehicle width direction side edge portions of the upper deploying portion are connected to each other, via the pair of upper ducts, from their rear end side to their front end side in the vehicle forward and rearward direction.

In this occupant protection system, the pair of upper ducts positioned on the upper side of the head of the occupant in the vehicle vertical direction are interposed between both side edge portions of the upper deploying portion and the pair of lateral inflating portions, so it is difficult for interference to arise between the upper deploying portion and the head as the second airbag is being inflated and deployed. For this reason, the deployment behavior of the second airbag can be stabilized compared to a configuration that does not have the pair of upper ducts.

An occupant protection system of a third aspect is the configuration of the second aspect, wherein in the inflated and deployed state of the second airbag, the front side of the second airbag in the vehicle forward and rearward direction in relation to the head of the occupant is open.

In this occupant protection system, the front side of the second airbag in the vehicle forward and rearward direction in relation to the head of the occupant is open, so it is difficult for interference to arise between the second airbag as it is being inflated and deployed and the head. For this reason, the deployment behavior of the second airbag can be stabilized.

An occupant protection system of a fourth aspect is the configuration of the second aspect, wherein the second airbag includes a front deploying portion that interconnects vehicle forward and rearward direction front ends of the pair of lateral inflating portions and becomes deployed without being inflated in front of the head of the occupant in the vehicle forward and rearward direction.

In this occupant protection system, the front deploying portion becomes deployed without being inflated in front of the head of the occupant in the vehicle forward and rearward direction. For this reason, for example, at the time of a frontal impact, absorption of the energy of the head of the occupant coming into contact with the front deploying portion can be accomplished by the deformation (stretching in the vehicle forward and rearward direction) of the lateral inflating portions.

An occupant protection system of a fifth aspect is the configuration of the fourth aspect, wherein the frame ducts include a pair of front ducts that receive a supply of gas from vehicle forward and rearward direction front ends of the upper ducts to become inflated and deployed downward in the vehicle vertical direction on the front side of the head of the occupant in the vehicle forward and rearward direction, and both vehicle width direction ends of the front deploying portion interconnect, via the pair of front ducts, vehicle forward and rearward direction front ends of the pair of lateral inflating portions.

In this occupant protection system, the front deploying portion is connected to the pair of front ducts that become inflated and deployed downward in the vehicle vertical direction in front of the head of the occupant after the upper ducts become inflated and deployed. For this reason, the front deploying portion becomes deployed downward after the vehicle forward and rearward direction front end of the second airbag has arrived in front of the head of the occupant in the vehicle forward and rearward direction, and it is difficult for the front deploying portion to interfere with the head of the occupant as the front deploying portion is being deployed.

An occupant protection system of a sixth aspect is the configuration of the fourth or fifth aspect, wherein the front deploying portion is configured to include a seeable structure that is disposed in a section of the front deploying portion positioned directly in front of the head of the occupant and allows the occupant to see the area on the front side of the front deploying portion.

In this occupant protection system, during and after the protection by the second airbag, the occupant can be allowed to see, through the seeable structure, the area (e.g., the cabin, outside the vehicle) on the front side of the front deploying portion.

An occupant protection system of a seventh aspect is the configuration of any one aspect of the second to sixth aspects, wherein the frame ducts include a gas introducing portion by which gas from an inflator is introduced in a vehicle width direction center portion of the second airbag and a fork portion that is forked from the gas introducing portion toward the pair of upper ducts, and the second airbag, in the state in which it is housed in the upper portion of the vehicle seat, is folded up in such a way as to include first folded portions in which the upper deploying portion is, together with the pair of lateral inflating portions and the pair of upper ducts, folded up into an outer roll shape toward the opposite side of the side that covers the head of the occupant and second folded portions in which the first folded portions are folded up symmetrically in the vehicle width direction relative to the gas introducing portion so that their widths in the vehicle width direction are reduced.

In this occupant protection system, when the gas from the inflator is introduced through the gas introducing portion to the frame ducts, the second folded portions become unfolded by the inflow of gas to the fork portion and then the first folded portions become unfolded on the opposite side of the side near the head of the occupant by the inflow of gas to the upper ducts and so forth. Because of this, the second airbag spreads out symmetrically in the vehicle width direction during the initial stage of being inflated and deployed, and the second airbag becomes smoothly and rapidly inflated and deployed forward in the vehicle forward and rearward direction in such a way that it is difficult for the second airbag to interfere with the head of the occupant around which the outer roll becomes unfolded.

An occupant protection system of an eighth aspect is the configuration of any one aspect of the second to seventh aspects, wherein the upper deploying portion includes a cross inflating portion that receives a supply of gas through the pair of upper ducts to become inflated and deployed and, in the inflated and deployed state, bridges the pair of upper ducts.

In this occupant protection system, the cross inflating portion of the upper deploying portion bridges the pair of upper ducts, so the inflated and deployed shape of the second airbag is stable.

An occupant protection system of a ninth aspect is the configuration of any one aspect of the first to eighth aspects, wherein the upper deploying portion includes an upper inflating portion that receives a supply of gas to become inflated and deployed above the head of the occupant.

In this occupant protection system, the upper inflating portion that receives a supply of gas to become inflated and deployed above the head of the occupant is disposed in the upper deploying portion, so the head of the occupant can also be protected with respect to a rollover crash, for example.

An occupant protection system of a tenth aspect is the configuration of any one aspect of the second to seventh aspects, wherein the upper deploying portion is a cloth which, in its deployed state in which it does not become inflated, interconnects the pair of upper ducts.

In this occupant protection system, the upper deploying portion is entirely a cloth that does not have a section that becomes inflated, so even in a case where the distance between the head of the occupant and the roof of the vehicle is short, the deployment behavior of the second airbag can be stabilized.

As described above, the occupant protection system pertaining to the present disclosure achieves the superior effect that it can protect the head of an occupant from various types of crashes by stabilizing the deployment behavior of an airbag having a pair of lateral inflating portions that become inflated and deployed from a vehicle vertical direction upper portion of a vehicle seat and cover the entire head of the occupant from both sides in the vehicle width direction.

BRIEF DESCRIPTION OF THE DRAWINGS

Exemplary embodiments of the present disclosure will be described in detail based on the following figures, wherein:

FIG. 2A is a sectional view, along line 2A-2A of FIG. 1, showing an inflated and deployed state of a head protecting airbag configuring the occupant protection system pertaining to the first embodiment;

FIG. 2B is a sectional view, along line 2B-2B of FIG. 1, showing the inflated and deployed state of the head protecting airbag configuring the occupant protection system pertaining to the first embodiment;

FIG. 3 is a sectional view, along line 3-3 of FIG. 2A, showing the inflated and deployed state of the head protecting airbag configuring the occupant protection system pertaining to the first embodiment;

FIG. 4A is a side view showing the schematic overall configuration, before activation, of the occupant protection system pertaining to the first embodiment;

FIG. 4B is a front view showing the schematic overall configuration, before activation, of the occupant protection system pertaining to the first embodiment;

FIG. 8A is a drawing showing a first example modification of the head protecting airbag configuring the first embodiment, and shows a flat pattern;

FIG. 8B is a sectional view, corresponding to FIG. 3, showing the first example modification of the head protecting airbag configuring the first embodiment;

FIG. 11A is a sectional view, along line 11A-11A of FIG. 10, showing an inflated and deployed state of a head protecting airbag configuring the occupant protection system pertaining to the second embodiment;

FIG. 11B is a sectional view, along line 11B-11B of FIG. 11A, showing the inflated and deployed state of the head protecting airbag configuring the occupant protection system pertaining to the second embodiment;

FIG. 13A is a sectional view, corresponding to FIG. 11A, showing a third example modification of the head protecting airbag configuring the second embodiment;

FIG. 13B is a sectional view, along line 13B-13B of FIG. 13A, showing the third example modification of the head protecting airbag configuring the second embodiment.

DETAILED DESCRIPTION

<First Embodiment>

Figure 1:
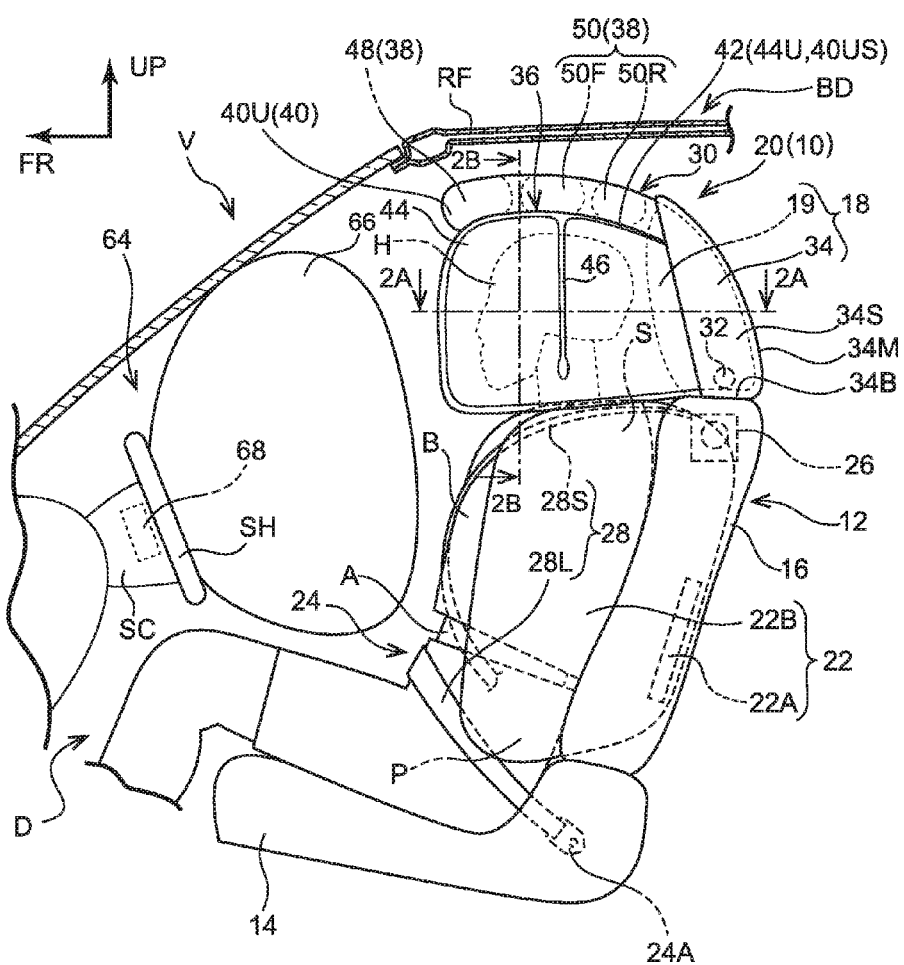
FIG. 1 is a side view schematically showing an activated state of an occupant protection system pertaining to a first embodiment.

An occupant protection system 10 pertaining to a first embodiment will now be described on the basis of FIG. 1 to FIG. 7. It should be noted that arrow FR and arrow UP appropriately shown on the drawings indicate a forward direction (the direction that a seated occupant faces) and an upward direction of a vehicle seat 12, respectively. When description is given below simply using the directions of front/rear and upper/lower, unless otherwise specified these will be understood to mean front/rear in the vehicle forward and rearward direction and upper/lower in the vehicle vertical direction. It should also be noted that arrow IN appropriately shown in the drawings indicates a center side in the vehicle width direction of a vehicle V serving as a vehicle in which the vehicle seat 12 is installed.

{Configuration of Vehicle Seat in which Occupant Protection System is Installed}

As shown in FIG. 1 to FIG. 4B, the occupant protection system 10 is installed in the vehicle seat 12. The vehicle seat 12 is placed offset in the vehicle width direction (on the left side in the present embodiment) relative to the vehicle width direction center of a vehicle body BD of the vehicle V. In this embodiment, the vehicle seat 12 is a driver's seat in which a driver D sits.

The forward and rearward direction of the vehicle seat 12 coincides with the forward and rearward direction of the vehicle, and the width direction of the vehicle seat 12 coincides with the vehicle width direction. The vehicle seat 12 is configured to have a seat cushion 14, a seat back 16 whose lower end is coupled to the rear end of the seat cushion 14, and a head rest 18 that is attached to the upper end of the seat back 16.

It should be noted that FIG. 1 to FIG. 4B and other drawings show a state in which a crash test dummy D, serving as a model of an occupant to be protected by the occupant protection system 10, is seated on the seat cushion 14 of the vehicle seat 12. The dummy D is, for example, the World Side Impact Dummy (WorldSID) AM50 (representing a 50th percentile American adult male). The dummy D is seated in a standard sitting posture determined by crash test procedures, and the vehicle seat 12 is positioned in a standard set position corresponding to the sitting posture. Below, in order to facilitate understanding of the description, the dummy D will be called "the driver D."

The head rest 18 is configured to include a head rest body 19, which is attached to the seat back 16, and a module case 34 (described later), which functions as a backboard configuring the design of the rear portion of the head rest 18. The head rest body 19 is attached to the seat back 16 via head rest stays 18S (see FIG. 7) as described later.

{Schematic Overall Configuration of Occupant Protection System}

As shown in FIG. 1, FIG. 4A, and FIG. 4B, the occupant protection system 10 is configured to be equipped with a driver's seat airbag device 64 serving as an airbag device for a frontal impact, a head protecting airbag device 20 serving as an airbag device for a side impact, a side airbag device 22, and a seat belt device 24. Below, the schematic configurations of the seat belt device 24, the side airbag device 22, and the driver's seat airbag device 64 will be described, and then the detailed configuration of the head protecting airbag device 20 will be described.

(Seat Belt Device)

The seat belt device 24 is a three-point seat belt device and is equipped with a belt (webbing) 28. One end of the belt 28 is taken up by a retractor 26 in such a way that the belt 28 can be pulled out from the retractor 26, and the other end of the belt 28 is anchored to an anchor 24A (see FIG. 1). As shown in FIG. 4A and FIG. 4B, a tongue plate 24T is slidably disposed on the belt 28, and the driver D puts on the belt 28 by causing the tongue plate 24T to engage with a buckle 24B. Additionally, the belt 28 includes a shoulder belt 28S, which extends from the retractor 26 to the tongue plate 24T, and a lap belt 28L, which extends from the tongue plate 24T to the anchor 24A. In a state in which the driver D is wearing the belt 28, the shoulder belt 28S is worn over the upper body of the driver D and the lap belt 28L is worn across a pelvic region P of the driver D.

In this embodiment, the seat belt device 24 is an in-seat seat belt device where the retractor 26, the anchor 24A, and the buckle 24B are disposed in the vehicle seat 12. Furthermore, in this embodiment, the retractor 26 has a pretensioner function which, upon being activated, forcibly takes up the belt 28. The pretensioner function of the retractor 26 is activated by a later-described ECU 60.

<<Side Airbag Device>>

As shown in FIG. 1, FIG. 4A, and FIG. 4B, the side airbag device 22 is configured to be equipped with an inflator 22A and a side airbag 22B. The side airbag 22B is housed in the vehicle width direction outer side portion of the seat back 16 in a state in which the side airbag 22B is folded up. The inflator 22A, when activated, generates a gas inside the side airbag 22B. This gas causes the side airbag 22B to inflate and deploy on the vehicle width direction outer side of the driver D so that the side airbag 22B projects forward from the side portion of the seat back 16. In this embodiment, the side airbag 22B inflates and deploys on the vehicle width direction outer side of the pelvic region P, an abdominal region A, a breast B, and a shoulder S of the driver D.

<<Driver's Seat Airbag Device>>

As shown in FIG. 1, FIG. 4A, and FIG. 4B, the driver's seat airbag device 64 is disposed inside the rear end portion of a steering column SC in the center portion of a steering wheel SH in relation to the vehicle seat 12. The driver's seat airbag device 64 is equipped with a driver's seat airbag 66 serving as a first airbag, an inflator 68 serving as a gas supply device, and an airbag case not shown in the drawings. The driver's seat airbag 66 is folded up with the inflator 68 built into its base end portion and is housed together with the inflator 68 in the airbag case.

The airbag case, in which the driver's seat airbag 66 and the inflator 68 are modularized in this way, is contained inside the rear end portion of the steering column SC, which is an element on the vehicle body BD side. That is, the driver's seat airbag 66 is housed in a section of the vehicle body BD located in front of the driver D in the vehicle forward and rearward direction. A rearward-facing opening in the airbag case and steering column SC is closed off by a steering wheel pad not shown in the drawings.

When the inflator 68 of the driver's seat airbag device 64 is activated by the later-described airbag ECU 60 serving as a control device, as shown in FIG. 1, the driver's seat airbag 66 receives a supply of gas generated by the inflator 68 and becomes inflated and deployed directly in front of the vehicle seat 12 (the driver D).

Although none of the drawings show this, the driver's seat airbag 66 becomes inflated and deployed in a circular shape as seen from the position of the driver D. In this inflated and deployed state, the driver's seat airbag 66 can restrain the head H and the breast B of the driver D.

<<<Configuration of Head Protecting Airbag Device>>>

As shown in FIG. 1, FIG. 4A, and FIG. 4B, the head protecting airbag device 20 is configured to have a head protecting airbag 30, serving as a second airbag, and an inflator 32. Although the details thereof will be described later, the head protecting airbag 30 is, in its folded up state, housed inside the head rest 18 configuring the upper portion of the vehicle seat 12. The head protecting airbag device 20 will be specifically described below.

(Head Protecting Airbag)

The head protecting airbag 30 is configured as a single bag that becomes inflated and deployed in such a way as to cover the head H of the driver D (hereinafter, sometimes "the head H of the driver D" will be simply called "the head H") from both sides in the vehicle width direction as shown in FIG. 2A and to cover the head H from above as shown in FIG. 2B. More specifically, as shown in FIG. 1 to FIG. 3, the head protecting airbag 30 is configured to have a pair of lateral deploying portions 36, which become inflated and deployed on both sides of the head H in the vehicle width direction, and an upper deploying portion 38, which becomes deployed above the head H. Furthermore, the head protecting airbag 30 pertaining to the present embodiment has frame ducts 40.

The head protecting airbag 30 will be specifically described below. Unless otherwise specified—that is, excluding cases where the flat pattern of the head protecting airbag 30 shown in FIG. 5 is referred to and cases where the folded-up state of the head protecting airbag 30 shown in FIG. 6A to FIG. 6C and FIG. 7 is described—the head protecting airbag 30 will be described in its inflated and deployed state or as it is being inflated and deployed.

[Frame Ducts]

Each frame duct 40 has a rear duct 40R, which extends vertically along the head rest 18 on both sides in the vehicle width direction, and an upper duct 40U, which extends in the forward direction from the upper end of the rear duct 40. The pair of upper ducts 40U, as shown in FIG. 2B, extend in the forward and rearward direction alongside each other in the vehicle width direction in positions on the upper side of the head H of the driver D and away from each other on one side and the other side of the head H in the vehicle width direction. The pair of upper ducts 40U are interposed between the lateral deploying portions 36 and the upper deploying portion 38.

Figure 5:
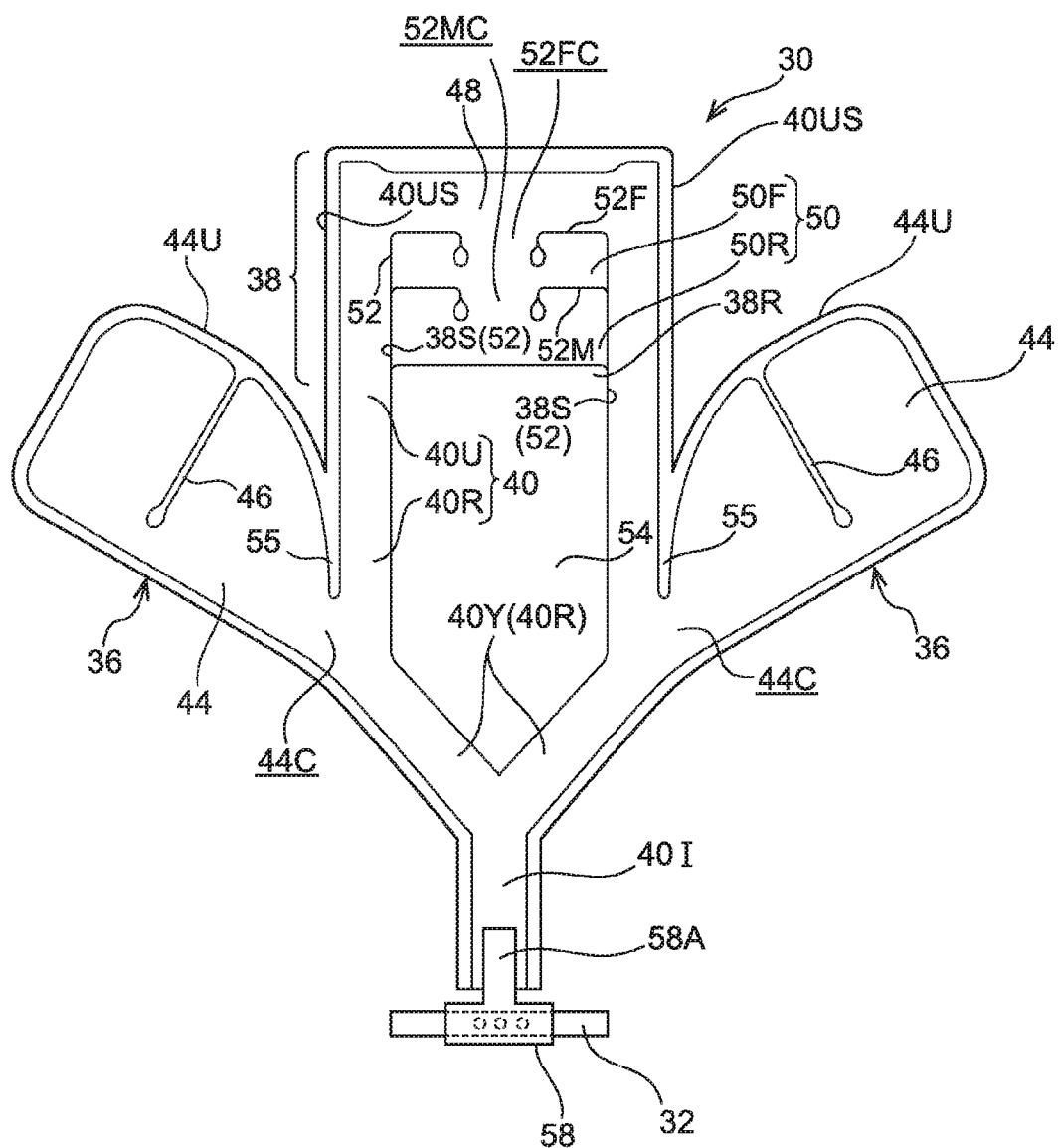
FIG. 5 is a drawing showing the flat pattern of the head protecting airbag configuring the occupant protection system pertaining to the first embodiment.

Furthermore, as shown in the flat pattern in FIG. 5, the rear ducts 40R are configured to include a Y-shaped fork portion 40Y whose end portion on the opposite side of the upper ducts 40U side configures the rear lower end side of the frame ducts 40. In other words, the pair of frame ducts 40 have a gas introducing portion 40I shared by their end portions on the rear side and lower side, and become separated into right and left ducts at the fork portion 40Y of the rear ducts 40R.

Consequently, gas introduced by the gas introducing portion 40I of the frame ducts 40 forks—that is, becomes distributed—in the vehicle width direction at the fork portion 40Y and is supplied in such a way that the rear ducts 40R and the upper ducts 40U on both sides in the vehicle width direction become sequentially inflated and deployed.

[Lateral Deploying Portions]

The lateral deploying portions 36 are configured to have lateral inflating portions 44 that receive a supply of gas to become inflated and deployed on the sides of the head H. As shown in FIG. 1, the lateral inflating portions 44 have a size (area) that overlaps the entire head H as seen in a side view. Because of this, the head protecting airbag 30 has a pair of lateral inflating portions 44 which, in a state in which the head protecting airbag 30 has received a supply of gas and become inflated and deployed, cover the entire head H of the driver D from both sides in the vehicle width direction. Furthermore, each lateral deploying portion 36 has a seam portion 46 serving as a partition portion that extends along the vertical direction and partitions the lateral inflating portion 44—excluding its lower portion—into front and rear sections.

In this embodiment, the seam portions 46 partition the lateral inflating portions 44 into front and rear sections at the sections of the lateral inflating portions 44 overlapping the head H. That is, each lateral inflating portion 44 pertaining to this embodiment can be understood as being configured by plural unitary inflating portions placed adjacent to each other in the forward and rearward direction, so that each entire lateral inflating portion 44 (the aggregate of the unitary inflating portions) covers the entire head H of the driver D from the vehicle width direction. Additionally, the lateral deploying portions 36 in this embodiment are entirely configured as the lateral inflating portions 44.

Here, included in the lateral inflating portions that cover the entire head H of the driver D from the vehicle width direction in the present disclosure are a configuration not having a non-inflating portion in the range that restrains the head H and a configuration having a non-inflating portion in the range that restrains the head H. The lateral inflating portions in the latter case are each configured in such a way that, in an inflated and deployed state, the head H moving along the vehicle width direction comes into contact with the inflated sections on both sides of the non-inflating portion and does not come into contact with the non-inflating portion. Consequently, for example, each lateral inflating portion may be configured as a single inflating portion not having a non-inflating portion in the range that covers the head H, or may be configured so as to be partitioned into front and rear sections (comprises plural unitary inflating portions) by a partition portion that is a non-inflating portion in the range that covers the head H as described above. Furthermore, for example, each lateral inflating portion may be configured to have in its central portion a non-inflating portion that is a hole or a cloth smaller than the head H.

As shown in FIG. 2B, in a state in which the head protecting airbag 30 has finished being inflated and deployed, lower ends 44L of the lateral inflating portions 44 of the lateral deploying portions 36 contact the tops of the shoulders S of the driver D. The position of the head protecting airbag 30 in the vertical direction in relation to (the head H of) the seated occupant is determined by this contact of the shoulders S by the lower ends 44L of the lateral inflating portions 44. In this positioned state, neither the pair of lateral deploying portions 36 nor the later-described upper deploying portion 38 of the head protecting airbag 30 contact the head H of the driver D in the normal sitting posture (spaces are formed between the head H and the pair of lateral deploying portions 36 and between the head H and the upper deploying portion 38).

In this embodiment, as shown in the flat pattern in FIG. 5, gas is supplied from the frame ducts 40 to the lateral inflating portions 44 through communicating passages 44C formed in sections that become the rear ends and lower ends of the lateral inflating portions 44. More specifically, the lateral inflating portions 44 are communicated via the communicating passages 44C to the rear ducts 40R (the vertically extending sections downstream of the fork portion 40Y) of the frame ducts 40. It should be noted that the rear edge portions of the lateral inflating portions 44 and the front edge portions of the rear ducts 40R in the inflated and deployed state of the head protecting airbag 30 are partitioned in the forward and rearward direction by seams 55.

[Upper Deploying Portion]

As shown in FIG. 3 and FIG. 5, the upper deploying portion 38 is configured to have a cross inflating portion 48 and an upper inflating portion 50. The cross inflating portion 48 receives a supply of gas to become inflated and deployed and, in the inflated and deployed state, bridges the pair of upper ducts 40U. The upper inflating portion 50 receives a supply of gas to become inflated and deployed above the head H of the driver D.

As shown in the flat pattern in FIG. 5, the cross inflating portion 48 is formed between the pair of upper ducts 40U in the vehicle width direction. Both vehicle width direction end portions of the cross inflating portion 48 are connected, in a state in which they are directly communicated, to the front ends of the pair of upper ducts 40U. Additionally, the cross inflating portion 48 receives a supply of gas through the upper ducts 40U to become inflated and deployed on the front side and the upper side of the head H.

Furthermore, the upper inflating portion 50 is partitioned by seams 52 from the pair of upper ducts 40U (the frame ducts 40) and the cross inflating portion 48, and becomes inflated and deployed above the head H. That is, the upper inflating portion 50 becomes inflated and deployed between a roof RF configuring the vehicle body BD of the vehicle V and the head H of the driver D. In this embodiment, gas is supplied to the upper inflating portion 50 through a communicating passage 52FC formed in a front portion 52F of the seam 52 that partitions the cross inflating portion 48 and the upper inflating portion 50 from each other in the forward and rearward direction. Furthermore, the upper inflating portion 50 in this embodiment is partitioned by a middle seam 52M into front and rear inflating portions 50F and 50R, and gas is supplied from the front inflating portion 50F to the rear inflating portion 50R through a communicating passage 52MC formed in the middle seam 52M.

A rear end portion 38R of the upper deploying portion 38 is a non-inflating portion comprising a cloth and is continuous with a later-described rear deploying portion 54.

[Rear Deploying Portion]

The head protecting airbag 30 has a rear deploying portion 54 that becomes deployed in back of the upper deploying portion 38. The rear deploying portion 54 is configured as a non-inflating portion that is continuous from the rear end portion 38R of the upper deploying portion 38 and comprises a single cloth. The cloth section configuring the rear deploying portion 54 and the rear end portion 38R of the upper deploying portion 38 interconnects the pair of frame ducts 40 (the upper ducts U and the rear ducts 40R including the fork portion 40Y) and the upper inflating portion 50.

[Supplementary Description of Inflated and Deployed State of Head Protecting Airbag]

In the head protecting airbag 30, upper edge portions 44U of the pair of lateral inflating portions 44 and both vehicle width direction side edge portions 38S of the upper deploying portion 38 are, as described later, connected to each other from their rear end side to their front end side. In this embodiment, the upper edge portions 44U of the pair of lateral inflating portions 44 and both vehicle width direction side edge portions 38S of the upper deploying portion 38 are connected to each other, via the upper ducts 40U, along their entire lengths in the vehicle forward and rearward direction.

Additionally, the head protecting airbag 30 is, as described later, supported by the seat back 16 via the inflator 32 (a diffuser 58) to which the gas introducing portion 40I of the frame ducts 40 is connected. That is, the rear portions of the pair of lateral inflating portions 44 and the rear portion of the upper deploying portion 38 are supported, via the rear deploying portion 54, the frame ducts 40, and the inflator 32, mainly in the forward and rearward direction by the upper portion of the seat back 16 and the head rest 18 that are the upper portion of the vehicle seat 12. Furthermore, as shown in FIG. 2A, the pair of rear ducts 40R of the head protecting airbag 30 become inflated and deployed while being sandwiched between the head rest body 19 and side walls 34S of the module case 34 and are supported in the vehicle width direction mainly by the head rest 18.

Moreover, as shown in FIG. 1, the head protecting airbag 30 in a non-restraining inflated and deployed state in which it does not restrain the driver D does not, as seen in a side view, coincide with (does not overlap) the side airbag 22B in a non-restraining inflated and deployed state in which it does not restrain the driver D. In other words, the head protecting airbag 30 and the side airbag 22B, in their non-restraining inflated and deployed states, do not have inflated and deployed sections that overlap each other at least as seen in a side view. Furthermore, although none of the drawings show this, the head protecting airbag 30 in a non-restraining inflated and deployed state does not, as seen in a front view, coincide with the side airbag 22B in a non-restraining inflated and deployed state in which it does not restrain the driver D.

Moreover, as shown in FIG. 1, the head protecting airbag 30 in a non-restraining inflated and deployed state does not interfere with the driver's seat airbag 66 in a non-restraining inflated and deployed state in which it does not restrain the driver D.

[Flat Pattern of Head Protecting Airbag]

The head protecting airbag 30 that becomes inflated and deployed as described above has the flat shape (flat pattern) shown in FIG. 5 before it is folded up. The head protecting airbag 30 having this flat shape is made as a single bag by one-piece-woven (OPW) technology. It should be noted that the head protecting airbag 30 may also be made as a single bag by a method (cut and sew) where the peripheral edge portions of textiles overlaid on top of each other are sewn together.

From the state of the flat pattern shown in FIG. 5, the upper edge portions 44U of the lateral inflating portions 44 configuring the lateral deploying portions 36 of the head protecting airbag 30 are joined along their entire lengths by sewn portions 42 to side edge portions 40US of the upper ducts 40U. Because of this, as described above, the head protecting airbag 30 has a configuration where the upper edge portions 44U of the pair of lateral inflating portions 44 and both vehicle width direction side edge portions 38S of the upper deploying portion 38 in the inflated and deployed state of the head protecting airbag 30 are connected to each other from their rear end side to their front end side (in this embodiment, from their rear ends to their front ends). Then, the head protecting airbag 30 is folded up from this connected state and housed in the head rest 18. The folded-up state of the head protecting airbag 30 will be described later.

Here, what is meant by "a configuration where the upper edge portions 44U of the pair of lateral inflating portions 44 and both vehicle width direction side edge portions 38S of the upper deploying portion 38 in the inflated and deployed state of the head protecting airbag 30 are connected to each other from their rear end side to their front end side" is a configuration where at least a section on the rear end side and a section on the front end side of a forward and rearward direction center are connected to each other. Consequently, for example, the head protecting airbag 30 may have a configuration where the upper edge portions 44U of the lateral inflating portions 44 are continuously joined to, or integrally formed with, the side edge portions 40US of the upper ducts 40 along their entire lengths. Furthermore, for example, the head protecting airbag 30 may have a configuration where the upper edge portions 44U of the lateral inflating portions 44 are joined to the side edge portions 40US of the upper ducts 40 at plural sections including sections on their rear end side and sections on their front end side relative to their forward and rearward direction centers.

[Folded-Up State of Head Protecting Airbag]

Figure 6A:
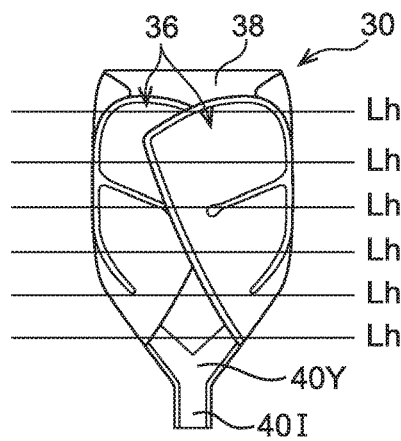
FIG. 6A is a front view, showing a state before roll folding, for describing the folded-up state of the head protecting airbag configuring the occupant protection system pertaining to the first embodiment.
Figure 6B:
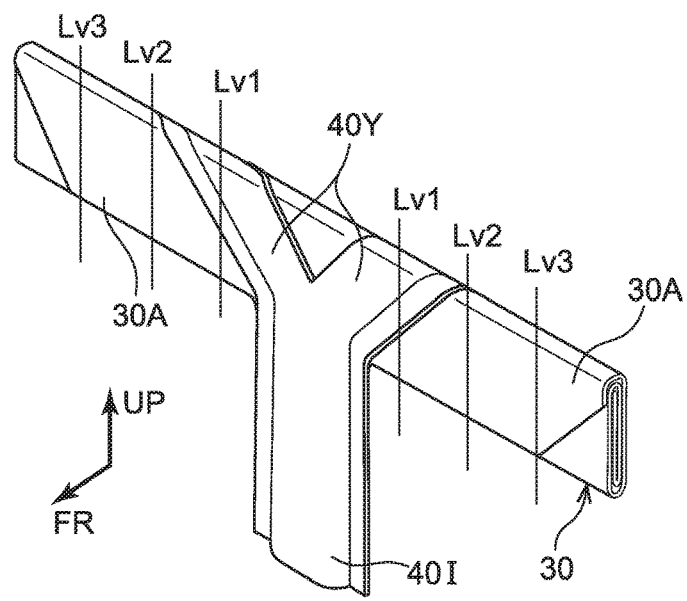
FIG. 6B is a perspective view, showing outer roll-shaped first folded portions, for describing the folded-up state of the head protecting airbag configuring the occupant protection system pertaining to the first embodiment.
Figure 6C:
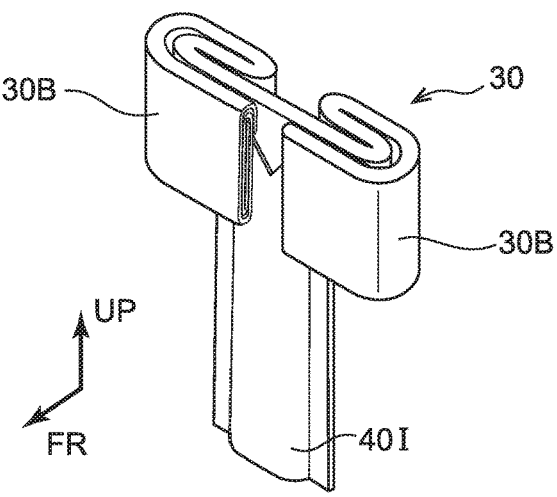
FIG. 6C is a perspective view, showing second folded portions in which the widths of the first folded portions are reduced, for describing the folded-up state of the head protecting airbag configuring the occupant protection system pertaining to the first embodiment.
Figure 7:
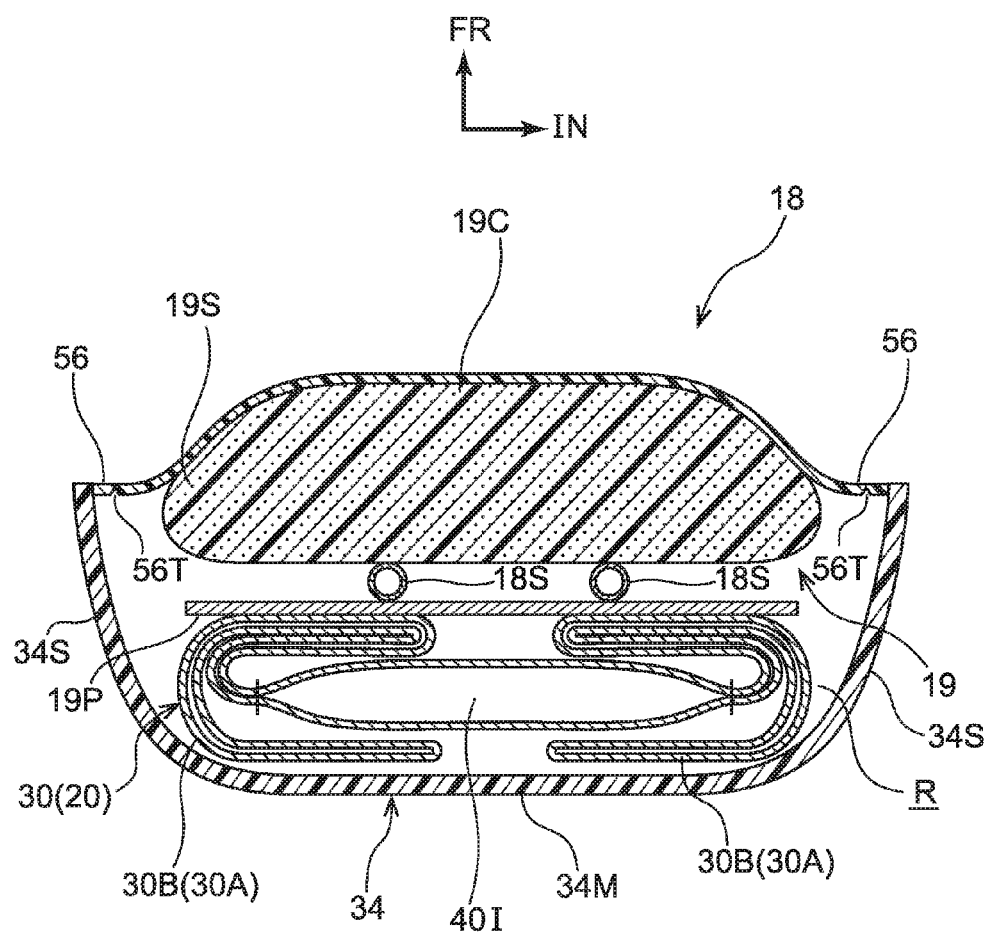
FIG. 7 is an enlarged plan sectional view showing a state in which the head protecting airbag configuring the occupant protection system pertaining to the first embodiment is housed in a head rest.

As shown in FIG. 6B, the head protecting airbag 30 is folded up in such a way as to include first folded portions 30A in which the upper deploying portion 38 is folded up into an outer roll shape toward the opposite side of the side that covers the head H. That is, the upper deploying portion 38 is folded up into an outer roll shape from its front end side in the inflated and deployed state toward its upper side and its rear side in the inflated and deployed state. The first folded portions 30A are formed by folding up, together with the upper deploying portion 38, the pair of lateral deploying portions 44, the pair of upper ducts 40U, and parts of the rear ducts 40R. Furthermore, as shown in FIG. 6C, the head protecting airbag 30 is also folded up in such a way as to include second folded portions 30B in which the first folded portions 30A are folded up symmetrically in the vehicle width direction relative to the gas introducing portion 40I so that their widths in the vehicle width direction are reduced. This will be specifically described below.

Before the head protecting airbag 30 is folded up in such a way as to include the first folded portions 30A, as shown in FIG. 6A, the lateral deploying portions 36 are folded (folded inward) with respect to the upper deploying portion 38 and the frame ducts 40 so that they lie on top of the surface on the side facing the head H in the inflated and deployed state. At this time, parts of the rear ducts 40R are also appropriately folded inward so that the lateral deploying portions 36, having the upper edge portions 44U of the lateral inflating portions 44 joined by the sewn portions 42 to the side edge portions 40US of the upper ducts 40, do not hinder the extension of the frame ducts 40.

From this state, the head protecting airbag 30 is folded over onto itself at plural fold lines Lh along the vehicle width direction shown in FIG. 6A, starting at the upper (the front side in the inflated and deployed state) fold line Lh and sequentially heading toward the opposite side (the far side of the page) of the side that covers the head H, so that the first folded portions 30A are formed as shown in FIG. 6B. At this time, the fork portion 40Y is positioned on the frontmost side of the first folded portions 30A, and the gas introducing portion 40I projects downward in relation to the first folded portions 30A. Because of this, the first folded portions 30A stick out on both sides in the vehicle width direction in relation to the gas introducing portion 40I.

Then, the first folded portions 30A are sequentially folded over onto themselves, starting at their center sides in the vehicle width direction, at plural fold-over lines Lv along the vehicle vertical direction, so that the second folded portions 30B, whose widths in the vehicle width direction are reduced in relation to the first folded portions 30A, are formed as shown in FIG. 6C. In this embodiment, there are three fold-over lines Lv in each of the first folded portions 30A, and each of the first folded portions 30A is first folded over onto itself in back at the two fold-over lines Lv1 and Lv2 close to the gas introducing portion 40I and is then folded over onto itself in front at the remaining fold-over line Lv3. In this embodiment, the sections folded over at the fold-over lines Lv3 are positioned frontmost.

[State in which Head Protecting Airbag is Housed in Head Rest]

The head protecting airbag 30 folded up as described above is, as shown in FIG. 7, housed inside the head rest 18 in such a way that the gas introducing portion 40I is positioned in the center of the head rest 18 in the vehicle width direction. Specifically, in its folded-up state the head protecting airbag 30 is placed between the head rest body 19 and the module case 34. This will be specifically described below along with supplementary description of the configuration of the head rest 18.

The head rest body 19 of the head rest 18 has a cushion 19C, which is secured to the head rest stays 18S, and a cover 19S, which covers the cushion 19C from the front side. Because of this, the head rest body 19 is supported, via the head rest stays 18S, by the seat back 16. Furthermore, a partition plate 19P that covers the head rest stays 18S from behind is disposed in the head rest body 19. A housing space R for housing the head protecting airbag 30 is formed by the partition plate 19P and the module case 34.

The partition plate 19P is formed in the shape of a flat plate. As shown in FIG. 1 and FIG. 3, the module case 34 is placed in back of the head rest body 19 and on top of the seat back 16. In this embodiment, the module case 34 is a backboard configuring (the design of the rear portion of) the head rest 18. The module case 34 in the present embodiment is configured so as to be both an element of the head rest 18 and an element serving as a constituent part of the head protecting airbag device 20 that supports the reaction force when the head protecting airbag 30 becomes forwardly inflated and deployed. Consequently, the head protecting airbag 30 is disposed on the inner side (in the interior) of the rear portion of the head rest 18.

The module case 34 projects upward beyond the upper end of the head rest body 19 as seen in a front view and sticks out on both sides in the vehicle width direction in relation to the head rest body 19. That is, the module case 34 covers the head rest body 19 from behind. In this embodiment, the module case 34 covers the rear portion of the head rest body 19 from above and from both sides in the vehicle width direction, and configures the design of the rear portion of the head rest 18 as described above. More specifically, the module case 34 is mainly configured by a base portion 34B, a main wall 34M serving as a rear wall, and a pair of side walls 34S that oppose each other in the vehicle width direction. The base portion 34B is a portion where the module case 34 is secured to the upper end of the seat back 16.

The main wall 34M projects upward from the rear end of the base portion 34B. The main wall 34M is forwardly tilted in such a way that its upper end is positioned in front of its lower end, which is secured to the top of the seat back 16, and the main wall 34M has a curved shape that becomes convex rearward and upward as seen in a side view. The main wall 34M projects upward beyond the upper end of the head rest body 19 as seen in a front view and sticks out on both sides in the vehicle width direction in relation to the head rest body 19. The housing space R for housing the head protecting airbag 30 in its folded-up state is, as described above, formed between the main wall 34M and the partition plate 19P configuring the head rest body 19. Furthermore, the upper end of the main wall 34M reaches above the head rest body 19. The head protecting airbag 30 as it is being inflated and deployed passes between the upper end portion of the main wall 34M and the head rest body 19. The pair of side walls 34S extend forward from both vehicle width direction ends of the main wall 34M and cover the rear portion of the head rest body 19 as seen in a side view. Mainly the rear ducts 40R of the frame ducts 40 of the head protecting airbag 30 in the inflated and deployed state pass between the pair of side walls 34S and the head rest body 19.

As shown in FIG. 4B, as seen in a front view, the space between the module case 34 and the head rest body 19 is closed off by an airbag door 56 formed on the peripheral edge portion of the cover 19S. The airbag door 56 allows the forward inflation and deployment of the head protecting airbag 30 when the airbag door 56 becomes ruptured at a tear line 56T, which is a weak portion, by the deployment pressure of the head protecting airbag 30.

(Inflator)

A combustible or cold gas inflator is employed for the inflator 32. The inflator 32 supplies, to the inside of the head protecting airbag 30, the gas it generates upon being activated. In this embodiment, the inflator 32 is a cylinder inflator that is long in its axial direction. The activation of the inflator 32 is controlled by the later-described ECU 60 serving as a control device.

In this embodiment, as shown in FIG. 5, the inflator 32 is connected via a T-shaped diffuser 58 to the head protecting airbag 30 in such a way that the inflator 32 can supply the gas to the head protecting airbag 30. That is, a gas discharge end 58A of the diffuser 58 is airtightly inserted into the gas introducing portion 40I of the head protecting airbag 30. Furthermore, although none of the drawings show this, the inflator 32 pertaining to this embodiment is, together with the module case 34, secured to the top of the seat back 16. Specifically, the inflator 32 has stud bolts that are passed through the head protecting airbag 30 and the base portion 34B of the module case 34, and nuts are screwed onto the stud bolts to thereby fasten the inflator 32 to a seat back frame.

(Configuration of ECU)

The head protecting airbag device 20, the side airbag device 22, the seat belt device 24, and the driver's seat airbag device 64 that configure the occupant protection system 10 are, as shown in FIG. 4A, controlled by an ECU 60 serving as a control device. Specifically, the inflator 32 of the head protecting airbag device 20, the inflator 22A of the side airbag device 22, the retractor 26 (pretensioner function) of the seat belt device 24, and the inflator 68 of the driver's seat airbag device 64 are electrically connected to the ECU 60.

Furthermore, the ECU 60 is electrically connected to a crash sensor 62 (or a sensor group). The ECU 60 can detect or predict, on the basis of information from the crash sensor 62, (the occurrence or inevitability of) a frontal impact and (the occurrence or inevitability of) a side impact to the vehicle V to which the ECU 60 has been applied.

The ECU 60 activates the inflators 22A and 32 when it detects or predicts a side impact on the basis of the information from the crash sensor 62. Furthermore, the ECU 60 activates the inflator 32, the retractor 26, and the inflator 68 when it detects or predicts a frontal impact on the basis of the information from the crash sensor 62. It should be noted that the ECU 60 may also be configured to activate the inflator 22A when it has detected or predicted a frontal impact.

{Operation and Effects}

Next, the operation of the present embodiment will be described.

In the occupant protection system 10 having the configuration described above, the ECU 60 activates the inflators 22A and 32 when it detects or predicts a side impact on the basis of the information from the crash sensor 62. Then, as shown in FIG. 1 to FIG. 3, the side airbag 22B of the side airbag device 22 is inflated and deployed on the vehicle width direction outer side of the driver D, and the head protecting airbag 30 of the head protecting airbag device 20 is inflated and deployed so as to cover the head H of the driver D from both sides in the vehicle width direction and from above.

Because of this, the shoulder S, the breast B, and the abdominal region A of the driver D are restrained from the side by the side airbag 22B, and the head H of the driver D is restrained from the side mainly by the lateral deploying portions 36 (the lateral inflating portions 44) of the head protecting airbag 30, so that the driver D is protected with respect to the side impact.

Furthermore, the ECU 60 activates the inflator 32, the retractor 26, and the inflator 68 when it detects or predicts a frontal impact on the basis of the information from the crash sensor 62. Because of this, the belt 28 of the seat belt device 24 is forcibly taken up by the retractor 26, the driver's seat airbag 66 is inflated and deployed in front of the head H of the driver D, and the head protecting airbag 30 is inflated and deployed so as to cover the head H of the driver D from both sides in the vehicle width direction and from above.

Because of this, the upper body of the driver D is restrained by the belt 28, and the head H and the breast B of the driver D are restrained from the front mainly by the driver's seat airbag 66, so that the driver D is protected with respect to the frontal impact. Furthermore, in a case where the frontal impact was an oblique crash or a small overlap crash, the driver D moves in an obliquely forward direction, which is the forward direction in the vehicle forward and rearward direction and the crash side in the vehicle width direction, but at this time the head H of the driver D is restrained by the driver's seat airbag 66 and the lateral inflating portions 44 of the head protecting airbag 30. Consequently, the driver D is protected by the occupant protection system 10 even with respect to an oblique crash or a small overlap crash.

Here, in the head protecting airbag 30, the upper edge portions 44U of the pair of lateral inflating portions 44 and the side edge portions 38S of the upper deploying portion 38 (the side edge portions 40US of the upper ducts 40U) that are each supported in back by the seat back 16 of the vehicle seat 12 are connected to each other from their rear end side to their front end side. For this reason, as the pair of lateral inflating portions 44 are being inflated and deployed, the deployment direction of the pair of lateral inflating portions 44 is limited by the upper portion of the seat back 16, the head rest 18, and the upper deploying portion 38, and the head protecting airbag 30 becomes stably inflated and deployed.

Furthermore, the occupant protection system 10 is equipped with the driver's seat airbag 66 that protects the driver D mainly with respect to a frontal impact, so the head protecting airbag 30 does not need a front inflating portion that inflates and deploys in front of the head H of the driver D. For this reason, compared to a comparative configuration where a front inflating portion integrally disposed in the head protecting airbag 30 housed in the head rest 18 is inflated and deployed in front of the head H of the driver D, the pair of lateral inflating portions 44 can be stably inflated and deployed on both sides of the head H in the vehicle width direction. In other words, compared to the comparative configuration, the pair of lateral inflating portions 44 can be inflated and deployed with a high degree of reliability on both sides of the head H in the vehicle width direction.

In this way, the occupant protection system 10 pertaining to the first embodiment can protect the head H of the driver D from various types of crashes by stabilizing the deployment behavior of the head protecting airbag 30 housed in the upper portion of the vehicle seat 12 and having the pair of lateral inflating portions 44 that cover the entire head H of the driver D from both sides in the vehicle width direction.

In particular, the movement of the lateral inflating portions 44 is also limited by the upper portion of the seat back 16, the head rest 18, and the upper deploying portion 38 after the lateral inflating portions 44 have become inflated and deployed, so an amount of movement of the head H during a side impact can be kept small by the lateral deploying portions 44. For this reason, the setup of other airbag devices can be omitted in a vehicle to which the occupant protection system 10 has been applied. For example, the setup of a curtain airbag device disposed in a roof side portion can be omitted. In other words, because a curtain airbag device is omitted in the occupant protection system 10, the deployment behavior of the head protecting airbag 30 can be stabilized in a configuration where the head protecting airbag 30, which has a large capacity compared to a case where it is used in combination with a curtain airbag device, is housed inside the head rest 18.

Furthermore, in the occupant protection system 10, the pair of upper ducts 40U are interposed between both side edge portions 38S of the upper deploying portion 38 and the upper edge portions 44U of the pair of lateral deploying portions 44. Additionally, the pair of upper ducts 40U become inflated and deployed in such a way as to extend in the forward and rearward direction alongside each other in the vehicle width direction in positions on the upper side of the head H of the driver D and away from each other on one side and the other side of the head H in the vehicle width direction as seen in a plan view. For this reason, it is difficult for interference to arise between the upper deploying portion 38 and the head H as the head protecting airbag 30 is being inflated and deployed. Because of this, the deployment behavior of the head protecting airbag 30 can be stabilized compared to a configuration that does not have the pair of upper ducts 40U. Moreover, the front side of the head protecting airbag 30 in relation to the head H is open, so compared to the comparative configuration equipped with the front inflating portion, the deployment behavior of the head protecting airbag 30 can be stabilized even more.

Moreover, the head protecting airbag 30 is folded up in such a way as to include the outer roll-shaped first folded portions 30A and the second folded portions 30B in which the first folded portions 30A are folded up symmetrically in the vehicle width direction relative to the gas introducing portion 40I so that their widths in the vehicle width direction are reduced. For this reason, when the gas from the inflator 32 is introduced through the gas introducing portion 40I to the frame ducts 40, the second folded portions 30B become unfolded and then the first folded portions 30A become unfolded so that the head protecting airbag 30 becomes inflated and deployed. That is, during the initial stage of being inflated and deployed the head protecting airbag 30 becomes deployed forward while spreading out symmetrically in the vehicle width direction from the gas introducing portion 40I. Because of this, the head protecting airbag 30 housed inside the head rest 18 can be smoothly and rapidly inflated and deployed.

Furthermore, in the occupant protection system 10, the cross inflating portion 48 of the upper deploying portion 38 bridges the pair of upper ducts 40U in the inflated and deployed state of the head protecting airbag 30, so the distance between the pair of upper ducts 40U (the frame ducts 40) is kept by the cross inflating portion 48. Because of this, the inflated and deployed shape of the head protecting airbag 30 overall is stable.

Furthermore, in the occupant protection system 10, the upper inflating portion 50 that receives a supply of gas to become inflated and deployed above the head H of the driver D is disposed in the upper deploying portion 38, so the head H of the driver D can also be protected with respect to a rollover crash.

{Example Modifications}

In the first embodiment, an example was described where the upper deploying portion 38 of the head protecting airbag 30 has the cross inflating portion 48 and the upper inflating portion 50, but the present disclosure is not limited to this.

For example, as shown in FIG. 8A and FIG. 8B, the head protecting airbag 30 may also be given a configuration pertaining to a first example modification that does not have the upper inflating portion 50. The upper deploying portion 38 pertaining to the first example modification, instead of having the upper inflating portion 50 that receives a supply of gas to become inflated and deployed, comprises a cloth that becomes deployed between the pair of upper ducts 40U and between the cross inflating portion 48 and the rear deploying portion 54. The cloth is formed integrally with the rear deploying portion 54. In the configuration pertaining to the first example modification also, basically the same effects can be obtained by the same operation as that of the first embodiment except for the operation and effects resulting from the upper inflating portion 50.

Figure 9A:
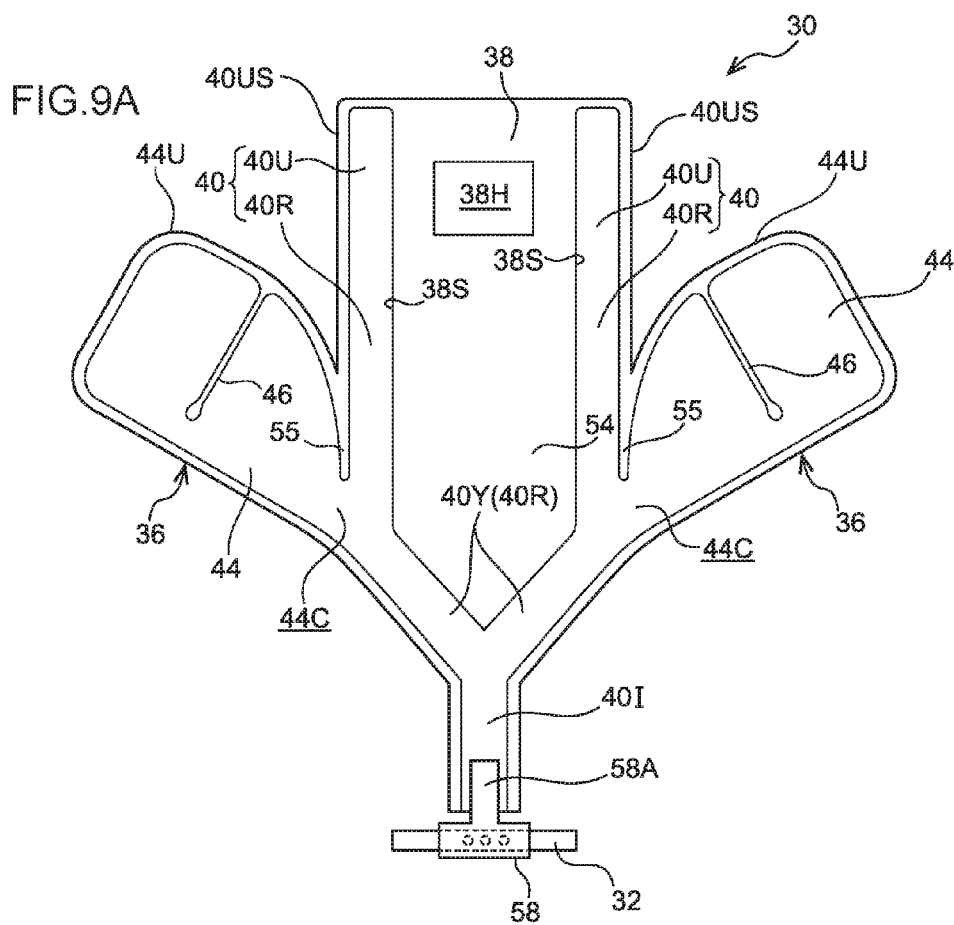
FIG. 9A is a drawing showing a second example modification of the head protecting airbag configuring the first embodiment, and shows a flat pattern.
Figure 9B:
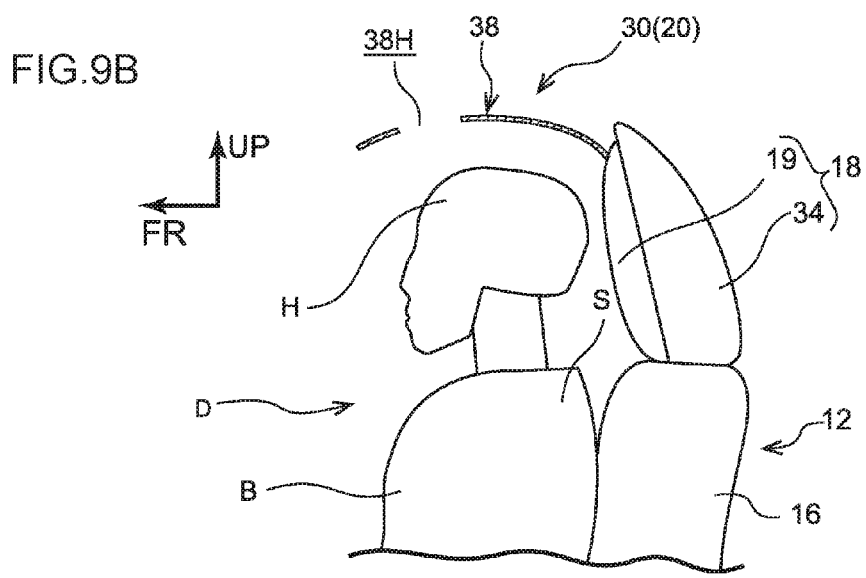
FIG. 9B is a sectional view, corresponding to FIG. 3, showing the second example modification of the head protecting airbag configuring the first embodiment.

Furthermore, for example, as shown in FIG. 9A and FIG. 9B, the head protecting airbag 30 may also be given a configuration pertaining to a second example modification that does not have the cross inflating portion 48 and the upper inflating portion 50. The upper deploying portion 38 pertaining to the second example modification, instead of having the cross inflating portion 48 and the upper inflating portion 50 that receive a supply of gas to become inflated and deployed, comprises a cloth that becomes deployed between the pair of upper ducts 40U and in front of the rear deploying portion 54. That is, the upper deploying portion 38 pertaining to the second example modification is configured by only a cloth which, in its deployed state in which it does not become inflated, interconnects the pair of upper ducts 40U. The cloth is formed integrally with the rear deploying portion 54. Although FIG. 9A and FIG. 9B show an example where a hole 38H is formed in the upper deploying portion 38, the head protecting airbag 30 may also be given a configuration where the hole 38H is not formed in the upper deploying portion 38.

In the configuration pertaining to the second example modification also, basically the same effects can be obtained by the same operation as that of the first embodiment except for the operation and effects resulting from the cross inflating portion 48 and the upper inflating portion 50. Furthermore, in the second example modification, the head protecting airbag 30 does not have a section that becomes inflated and deployed over the upper side of the head H of the driver D. That is, the upper deploying portion 38 is entirely a cloth that does not have a section that becomes inflated, so even in a case where the distance between the head H of the driver D and the roof RF of the vehicle V is short, the head protecting airbag 30 can be stably inflated and deployed. Because of this, in the configuration pertaining to the second example modification, the deployment behavior of the head protecting airbag 30 can be stabilized.

It should be noted that, although none of the drawings show this, the head protecting airbag 30 may also be given a configuration where the upper deploying portion 38 has the upper inflating portion 50 but does not have the cross inflating portion 48. Furthermore, the upper deploying portion 38 may be given a configuration having a cross inflating portion that becomes inflated and deployed above the head H, with the cross inflating portion doubly having the function of an upper inflating portion. Moreover, the upper inflating portion 50 is not limited to a configuration having the front and rear inflating portions 50F and 50R, and may also be configured by a single or three or more inflating portions.

<Other Embodiments>

Next, other embodiments will be described. Regarding configurations and operation that are basically the same as those of the first embodiment or its example modifications, reference numerals that are the same as those in the first embodiment or its example modifications will be assigned thereto, and sometimes description and illustration thereof will be omitted.

<Second Embodiment>

Figure 10:
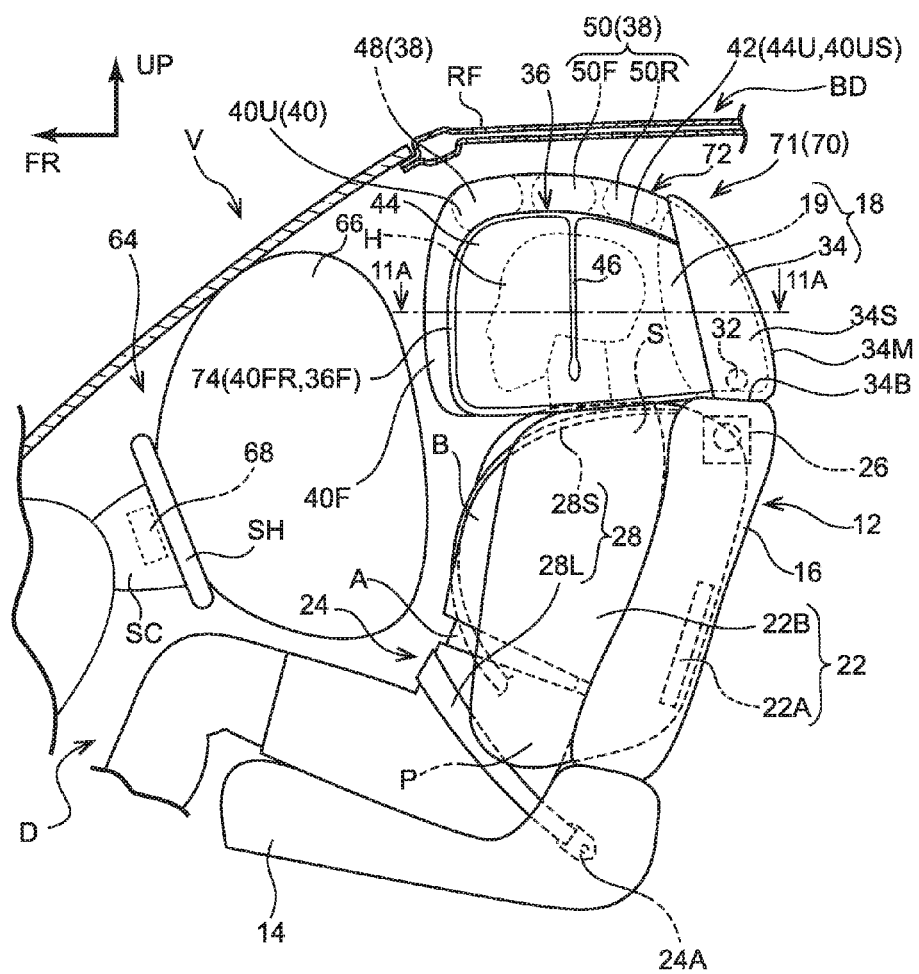
FIG. 10 is a side view schematically showing an activated state of an occupant protection system pertaining to a second embodiment.
Figure 12:
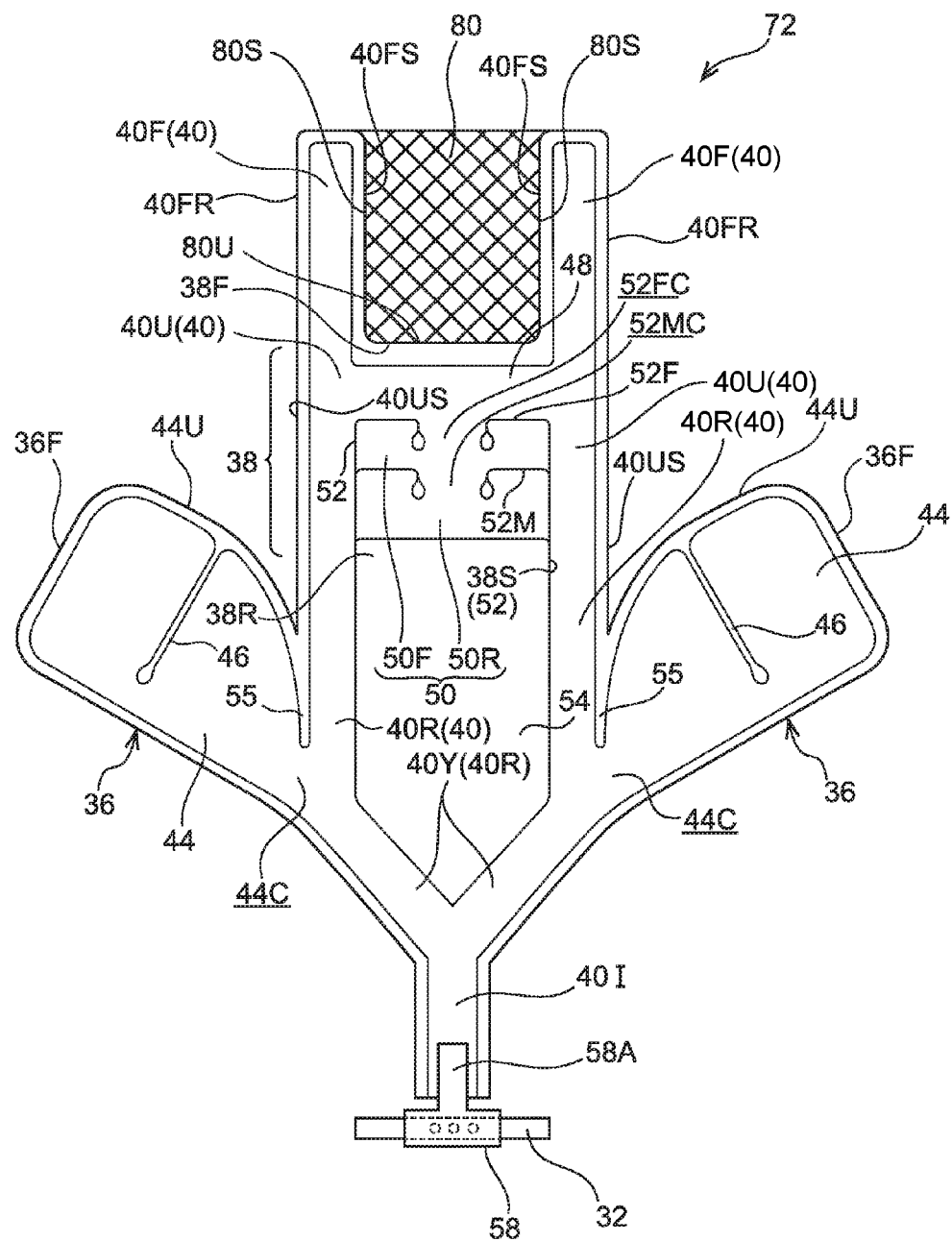
FIG. 12 is a drawing showing the flat pattern of the head protecting airbag configuring the occupant protection system pertaining to the second embodiment.

An occupant protection system 70 pertaining to a second embodiment will be described on the basis of FIG. 10 to FIG. 12. In FIG. 10 the occupant protection system 70 pertaining to the second embodiment is shown by way of a side view corresponding to FIG. 1. Furthermore, in FIG. 11A a sectional view along line 11A-11A of FIG. 10 is shown, and in FIG. 11B a sectional view along line 11B-11B of FIG. 11A is shown. As shown in these drawings, a head protecting airbag device 71 configuring the occupant protection system 70 is equipped with a head protecting airbag 72 instead of the head protecting airbag 30. The head protecting airbag 72 differs from the head protecting airbag 30 in that it includes a front deploying portion 80 that becomes deployed without being inflated in front of the head H and in that the pair of frame ducts 40 have front ducts 40F.

In the inflated and deployed state of the head protecting airbag 72, the front ducts 40F hang down from the front ends of the upper ducts 40U. Rear edge portions 40FR of the front ducts 40F are joined along their entire height by sewn portions 74 to front edge portions 36F of the lateral deploying portions 36. In this embodiment, the front ducts 40F are joined to the front sides of the lateral deploying portions 44 via the sewn portions 74 that are non-inflating portions.

The front deploying portion 80, which becomes deployed without being inflated, is configured by a cloth or knit that is a textile, for example. In this embodiment, the front deploying portion 80 is a mesh that is a textile, and is configured as a seeable structure (to include a seeable structure) that allows the driver D to see the area on the front side of the front deploying portion 80. As shown in FIG. 12, which shows the flat pattern of the head protecting airbag 72, the front deploying portion 80 is entirely configured by a mesh. Here, what is meant by a "front deploying portion 80 including a seeable structure" is a structure where one can see the other side from one side in the thickness direction (the vehicle forward and rearward direction) of the structure. Consequently, in the front deploying portion 80 including a seeable structure, the seeable structure is placed in the section of the front deploying portion 80 that becomes deployed directly in front of the head H. As the front deploying portion 80 including a seeable structure, a member comprising a rectangular frame-shaped cloth joined to the periphery of a rectangular mesh, for example, may be used. Furthermore, a cloth having one or plural holes formed therein, for example, may also be used.

An upper edge portion 80U of the front deploying portion 80 is joined to a front edge portion 38F of the upper deploying portion 38 (the cross inflating portion 48). Furthermore, both vehicle width direction side edge portions 80S of the front deploying portion 80 are joined to vehicle width direction inner edge portions 40FS of the front ducts 40F. Because of this, the front deploying portion 80 interconnects, via the front ducts 40F, the front ends of the pair of lateral inflating portions 44.

Other configurations of the occupant protection system 70 are configured in the same way as the corresponding configurations of the occupant protection system 10. Consequently, the occupant protection system 70 basically achieves the same effects by the same operation as that of the occupant protection system 10.

Furthermore, the occupant protection system 70 is equipped with the front deploying portion 80 that interconnects the pair of lateral inflating portions 44 and becomes deployed in front of the head H of the driver D. For this reason, for example, at the time of a frontal impact, absorption of the energy of the head H coming into contact with the front deploying portion 80 can be accomplished by the deformation (stretching in the forward and rearward direction) of the lateral inflating portions 44. Because of this, for example, it becomes possible to reduce the capacity and lower the internal pressure of the driver's seat airbag 66. Furthermore, even if the head H moves in an obliquely forward direction, absorption of the energy is accomplished by the deformation of the lateral deploying portions 44, so the driver D can be protected with respect to a small overlap crash or an oblique crash, for example.

Moreover, in the occupant protection system 70, the front ducts 40F that receive a supply of gas through the upper ducts 40U become inflated and deployed downward in front of the head H later than the upper ducts 40U. Additionally, both side edge portions of the front deploying portion 80 are joined to the pair of front ducts 40F, so the front deploying portion 80 becomes deployed downward after the front end of the head protecting airbag 72 has arrived in front of the head H, and it is difficult for the front deploying portion 80 to interfere with the head H as the front deploying portion 80 is being deployed.

Furthermore, in the occupant protection system 70, the front deploying portion 80 is configured by a mesh that is a seeable structure. For this reason, during and after the protection of the driver D by the head protecting airbag 72, the driver D can be allowed to see, through the front deploying portion 80, the area on the front side of the front deploying portion 80 in a configuration that can accomplish absorption of the energy of the head H by the head protecting airbag 72 as described above.

Example Modifications

Figure 14:
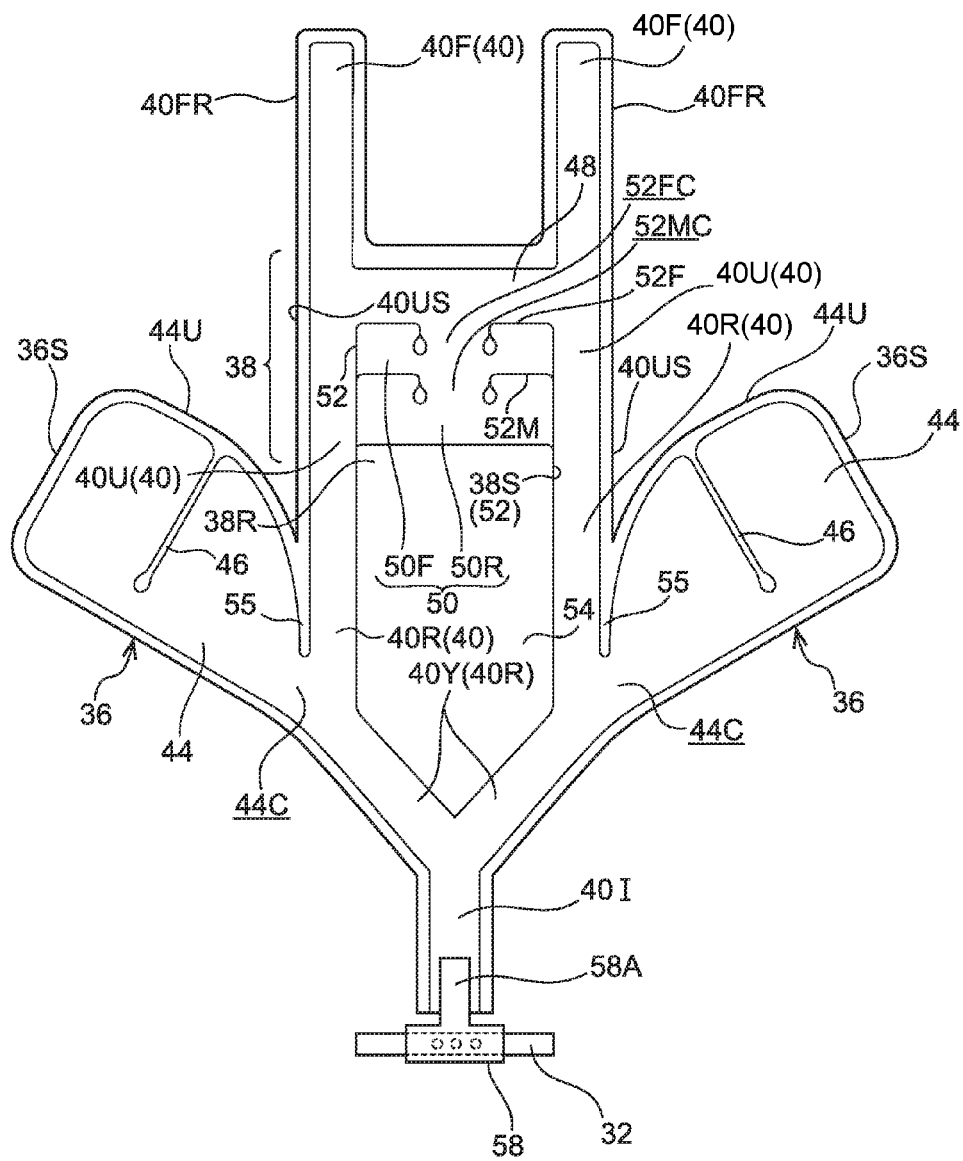
FIG. 14 is a drawing showing a flat pattern in the third example modification of the head protecting airbag configuring the second embodiment.

In the second embodiment, an example was described where the head protecting airbag 72 has the front deploying portion 80, but the present disclosure is not limited to this. For example, as shown in FIG. 13A, FIG. 13B, and FIG. 14, the head protecting airbag 72 may also be given a configuration pertaining to a third example modification that does not have the front deploying portion 80. In the third example modification, the space between the pair of front ducts 40F, that is, the front side of the upper deploying portion 38 in relation to the head H of the driver D, is open. In the configuration pertaining to the third example modification, basically the same effects can be obtained by the same operation as that of the first embodiment.

Furthermore, in the second embodiment, an example was described where the front deploying portion 80 interconnects, via the front ducts 40F, the pair of lateral inflating portions 44, but the present disclosure is not limited to this. For example, the head protecting airbag 72 may also be given a configuration where both vehicle width direction side edge portions 80S of the front deploying portion 80 are directly joined to the front edge portions 38F of the pair of lateral deploying portions 36 so that the front deploying portion 80 interconnects the front ends of the pair of lateral inflating portions 44.

Moreover, in the second embodiment, an example was described where the front deploying portion 80 includes a seeable structure, but the present disclosure is not limited to this. For example, the head protecting airbag 72 may also be given a configuration where, instead of the front deploying portion 80, it is equipped with a front deploying portion comprising a cloth that does not include a seeable structure.

Furthermore, the configuration pertaining to the first example modification (the example not having the upper inflating portion 50) or the second example modification (the example not having the cross inflating portion 48 and the upper inflating portion 50) of the first embodiment may also be employed in the head protecting airbag 72 of the second embodiment.

<Other Example Modifications>

In the first and second embodiments, examples were described where the occupant protection systems 10 and 70 are equipped with the side airbag device 22, but the present disclosure is not limited to this. For example, the occupant protection systems 10 and 70 may also be given a configuration where they are not equipped with the side airbag device 22. Furthermore, when the occupant protection systems 10 and 70 are equipped with a side airbag device, their configuration is not limited to a configuration where the side airbag device is disposed in the vehicle seat 12. For example, the occupant protection systems 10 and 70 may also be configured in such a way that they are equipped with a side airbag device disposed in a side door or the like. Moreover, in the first and second embodiments, examples were described where the occupant protection systems 10 and 70 are equipped with the side airbag device 22 on the vehicle width direction outer side, but the present disclosure is not limited to this. For example, the occupant protection systems 10 and 70 may also be given a configuration where they are equipped with a side airbag device placed on the vehicle width direction center side instead of, or in addition to, the side airbag device 22 on the vehicle width direction outer side.

Furthermore, in the first and second embodiments, examples were described where the occupant protection systems 10 and 70 are equipped with the seat belt device 24, but the present disclosure is not limited to this. For example, the occupant protection systems 10 and 70 may also be given a configuration where they are not equipped with the seat belt device 24. Furthermore, when the occupant protection systems 10 and 70 are equipped with a seat belt device, their configuration is not limited to a configuration where the seat belt device is disposed in the vehicle seat 12. For example, the occupant protection systems 10 and 70 may also be given a configuration where the retractor, anchor, buckle, and so forth are disposed on the vehicle body side. Furthermore, when the occupant protection systems 10 and 70 are equipped with a seat belt device, the seat belt device is not limited to a three-point seat belt device and may also be a four-point or two-point seat belt device.

Moreover, in the first and second embodiments, examples were described where the vehicle seat 12 is a driver's seat, but the present disclosure is not limited to this. For example, the configurations of the present disclosure may also be applied to a front passenger seat or a separate type seat in a second row or beyond. It should be noted that the first airbag in the case where the configurations of the present disclosure are applied to a front passenger seat is, for example, a front passenger seat airbag housed in an instrument panel. Furthermore, the first airbag in the case where the configurations of the present disclosure are applied to a seat in a second row or beyond is an airbag housed in a seat back or the like in the preceding row. Furthermore, the vehicle seat 12 is not limited to a configuration where it is placed in a position offset from the vehicle width direction center of the vehicle body, and, for example, the vehicle width direction center of the vehicle seat 12 may also coincide with the vehicle width direction center of the vehicle body.

Furthermore, in the first and second embodiments and the example modifications, an example was described where the first airbag is the driver's seat airbag 66 or a front passenger seat airbag that becomes inflated and deployed toward the occupant of the vehicle seat 12, but the present disclosure is not limited to this. The occupant protection system pertaining to the present disclosure may also be given a configuration where it is equipped with a first airbag that is housed, for example, in the roof RF and becomes inflated and deployed downward in the vehicle vertical direction.

Furthermore, in the first and second embodiments, examples were described where the head protecting airbag devices 20 and 71 are entirely housed in the head rest 18, but the present disclosure is not limited to this. For example, parts of the head protecting airbags 30 and 72 configuring the head protecting airbag devices 20 and 71 may also be placed inside the seat back 16. Furthermore, at least part of the gas supplying portion including the inflator 32 may also be placed inside the seat back 16. Additionally, the section of the vehicle seat 12 that supports, from behind, the lateral inflating portions 44 and the upper deploying portion 38 configuring the head protecting airbags 30 and 72 may be just the head rest 18 or may be just the seat back 16. Furthermore, for example, in a configuration where the inflator 32 is secured to a vertically extending side frame of a seat back frame, the section that supports the lateral inflating portions 44 and the upper deploying portion 38 from behind may also include the vertical direction middle portion or lower portion of the seat back 16 (the vehicle seat 12).

Moreover, in the first and second embodiments, examples were described where the head protecting airbags 30 and 72 have the frame ducts 40, but the present disclosure is not limited to this. For example, the head protecting airbags 30 and 72 may also be given a configuration where they do not have the frame ducts 40 and where the upper edge portions 44U of the lateral inflating portions 44 are directly connected to the side edge portions 38S of the upper deploying portion 38.

Furthermore, in the first and second embodiments, examples were described where the lateral inflating portions 44 receive a supply of gas through the communicating passages 44C from the rear ducts 40R of the frame ducts 40, but the present disclosure is not limited to this. For example, the lateral inflating portions 44 may also be given a configuration where they receive a supply of gas from the upper ducts 40U or the front ducts 40F or a configuration where they receive a supply of gas not through the frame ducts 40.

Moreover, in the first embodiment, an example was described where the head protecting airbag 30 was outer-roll-folded, but the present disclosure is not limited to this. For example, the head protecting airbag 30 may also be folded up in another way, such as accordion-folded, and housed in the head rest 18.

In addition, it goes without saying that the present disclosure can be modified and implemented in a variety of ways without departing from the spirit thereof. For example, the configurations (elements) in the embodiments and example modifications may also be appropriately combined and switched around.

What is claimed is:

1. An occupant protection system comprising:
a first airbag housed in a section of a vehicle body in a vehicle cabin configured to be located in front of an occupant seated on a vehicle seat in the vehicle forward and rearward direction, the first airbag being configured to inflate and deploy in a deployed state in front of the occupant in the vehicle forward and rearward direction; and
a second airbag housed in a vehicle vertical direction upper portion of the vehicle seat, the second airbag being configured to inflate and deploy in a deployed state, the second airbag including:
a pair of lateral inflating portions configured to cover either side of a head of the occupant in a vehicle width direction when the second airbag is in the deployed state, and
an upper deploying portion configured to cover a top side of the head of the occupant in a vehicle vertical direction when the second airbag is in the deployed state,
wherein when the second airbag is in the deployed state:
the pair of lateral inflating portions and the upper deploying portion are each supported on a rear side in the vehicle forward and rearward direction by the vehicle seat,
vehicle vertical direction upper edge portions of the pair of lateral inflating portions and vehicle width direction side edge portions of the upper deploying portion are connected to each other from a respective rear end side to a respective front end side in the vehicle forward and rearward direction on the top side of the head of the occupant in the vehicle vertical direction, and the second airbag is configured to form an unobstructed space between the first airbag and a headrest of the vehicle seat for the occupant seated on the vehicle seat.

2. The occupant protection system according to claim 1, wherein:

the second airbag further includes frame ducts having a pair of upper ducts which, in the deployed state of the second airbag, are configured to extend in the vehicle forward and rearward direction alongside each other in the vehicle width direction, in positions on the top side of the head of the occupant in the vehicle vertical direction and away from each other on either side of the head of the occupant in the vehicle width direction, and the vehicle vertical direction upper edge portions of the pair of lateral inflating portions and the vehicle width direction side edge portions of the upper deploying portion are connected to each other, via the pair of upper ducts, from a rear end side of each one of the pair of lateral inflating portions to a front end side of each one of the pair of lateral inflating portions in the vehicle forward and rearward direction.

3. The occupant protection system according to claim 2, wherein, in the deployed state of the second airbag, a front side of the second airbag is open, such that the head of the occupant may move forward in the vehicle forward and rearward direction.

4. The occupant protection system according to claim 2, wherein the second airbag includes a front deploying portion connecting vehicle forward and rearward direction front ends of the pair of lateral inflating portions and configured to deploy without being inflated in front of the head of the occupant in the vehicle forward and rearward direction.

5. The occupant protection system according to claim 4, wherein:

the frame ducts include a pair of front ducts configured to inflate and deploy downward in the vehicle vertical direction on the front side of the head of the occupant in the vehicle forward and rearward direction, and both vehicle width direction ends of the front deploying portion interconnect, via the pair of front ducts, vehicle forward and rearward direction front ends of the pair of lateral inflating portions.

6. The occupant protection system according to claim 4, wherein the front deploying portion includes a seeable structure that, when the second airbag is in the deployed state, the seeable structure is configured to be disposed in a section of the front deploying portion and is positioned directly in front of the head of the occupant such that the seeable structure allows the occupant to see the area on the front side of the front deploying portion.

7. The occupant protection system according to claim 2, wherein the frame ducts include:

a gas introducing portion configured to introduce gas from an inflator into a vehicle width direction center portion of the second airbag, and a fork portion configured to be forked by the gas introducing portion toward the pair of upper ducts when the gas introducing portion introduces gas from the inflator; and wherein the second airbag has a folded up state, in the folded up state, the second airbag is housed in the upper portion of the vehicle seat and includes:

first folded portions within which the upper deploying portion, the pair of lateral inflating portions, and the pair of upper ducts folded up into an outer roll shape toward an opposite side of a side that is configured to cover the head of the occupant, and second folded portions within which the first folded portions are folded up symmetrically in the vehicle width direction relative to the gas introducing portion such that respective widths of the first folded portions in the vehicle width direction are reduced.

8. The occupant protection system according to claim 2, wherein the upper deploying portion includes a cross inflating portion configured to receive a supply of gas through the pair of upper ducts in order to become inflated and bridge the pair of upper ducts.

9. The occupant protection system according to claim 2, wherein the upper deploying portion is a cloth connecting the pair of upper ducts when the upper deploying portion is deployed without being inflated.

10. The occupant protection system according to claim 1, wherein the upper deploying portion includes an upper inflating portion configured to receive a supply of gas to become inflated and deployed above the head of the occupant.

* * * * *